US012196021B2

(12) United States Patent
Veilleux et al.

(10) Patent No.: US 12,196,021 B2
(45) Date of Patent: Jan. 14, 2025

(54) APPARATUSES FOR INSTALLING GLASS SHOWER DOORS

(71) Applicant: Maax Bath Inc., Lachine (CA)

(72) Inventors: Christine Lacasse Veilleux, Montreal (CA); Martin Desaulniers, Rosemere (CA); Dominique Robert-Beaudoin, Laval (CA)

( * ) Notice: Subject to any disclaimer, the term of this patent is extended or adjusted under 35 U.S.C. 154(b) by 119 days.

(21) Appl. No.: 17/939,889

(22) Filed: Sep. 7, 2022

(65) Prior Publication Data

US 2023/0003064 A1 Jan. 5, 2023

Related U.S. Application Data

(62) Division of application No. 17/187,659, filed on Feb. 26, 2021, now Pat. No. 11,466,495.

(60) Provisional application No. 63/010,632, filed on Apr. 15, 2020, provisional application No. 62/983,748, filed on Mar. 1, 2020.

(51) Int. Cl.
*E05D 15/06* (2006.01)
*A47K 3/34* (2006.01)

(52) U.S. Cl.
CPC ....... *E05D 15/0652* (2013.01); *E05D 15/063* (2013.01); *A47K 3/34* (2013.01); *E05D 15/0656* (2013.01); *E05Y 2201/11* (2013.01); *E05Y 2201/64* (2013.01); *E05Y 2201/684* (2013.01); *E05Y 2201/688* (2013.01); *E05Y 2600/452* (2013.01); *E05Y 2900/114* (2013.01)

(58) Field of Classification Search
CPC ........ A47K 3/34; A47K 3/36; E05D 15/0652; E05Y 2201/64; E05Y 2201/684; E05Y 2900/114
See application file for complete search history.

(56) References Cited

U.S. PATENT DOCUMENTS

| | | | | |
|---|---|---|---|---|
| 6,381,904 B1 * | 5/2002 | Tedescucci | A47K 3/34 49/413 |
| 9,486,114 B2 * | 11/2016 | Ball | A47K 3/00 |
| 2011/0072577 A1 * | 3/2011 | Luedke | A47K 3/34 4/607 |

FOREIGN PATENT DOCUMENTS

CH 665677 A5 * 5/1988

* cited by examiner

*Primary Examiner* — Erin Deery
(74) *Attorney, Agent, or Firm* — Bradley Arant Boult Cummings LLP; Phillip E. Walker; Alex H. Huffstutter

(57) ABSTRACT

Apparatuses, such as shower door frame kits, for installing sliding shower door assemblies are provided. The apparatuses enable secure and convenient installation of the sliding shower door assemblies, while keeping water that may escape a shower area to a minimum. The apparatuses of the present disclosure also provide for efficient installation of the sliding shower door assemblies that can be completed with a single tool and/or in a single step. The apparatuses for installing sliding shower door assemblies may include one or more of a shower door header, a wall jamb, a shower header retainer, a shower door catcher, a roller assembly, a corner bracket, and a shower threshold.

12 Claims, 26 Drawing Sheets

APPARATUSES FOR INSTALLING GLASS SHOWER DOORS

TECHNICAL FIELD

The present disclosure relates to an apparatuses, and methods of installing, glass shower doors. More specifically, the disclosure is directed towards an apparatus and methods to secure glass shower doors within a frame.

BACKGROUND OF THE DISCLOSURE

Sliding doors are commonly used for shower and tub enclosures. Typical sliding shower door assemblies include one or more door panels in rolling engagement with respective rails of a door header. Each of the door panels are configured to slide along the rails within the header to allow for ingress and egress of a user from, for example, a shower or a tub enclosure. The door header is typically coupled between fixed portions of a shower enclosure and may include a track for receiving a roller assembly. The roller assembly slides along the track forming part of the header. These headers, however, are typically bulky and metallic, which reduce the aesthetic appeal of the sliding doors. With sliding door assemblies, there is also a risk that the sliding door may "jump" or move from the track such that the sliding door may derail. Given that sliding doors are generally made of glass and are heavy and fragile, derailment of the sliding door may result in serious injury or risk of injury, as well as damage to the sliding door.

Moreover, the installation of sliding shower door assemblies requires a significant amount of effort by an installer. For example, the installer may need to measure and mark locations for drilling holes, mount various components (for example, headers, frame rails, and guide members) align various components, and hang door assemblies. The installation process can be challenging and time-consuming. The installer may also be required to use numerous different tools in installing the various components of the shower door assemblies.

Accordingly, there remains a need in the art for improved components of sliding shower door assemblies and more efficient and simplistic methods to install the components of the sliding shower door assemblies.

SUMMARY

The problems expounded above, as well as others, are addressed by the following inventions, although it is to be understood that not every embodiment of the inventions described herein will address each of the problems described above. In some embodiments, the present disclosure provides apparatuses, such as shower door frame kits, for installing sliding shower door assemblies. The apparatuses enable secure and convenient installation of the sliding shower door assemblies, while keeping water that may escape a shower area to a minimum. The apparatuses of the present disclosure also provide for efficient installation of the sliding shower door assemblies that can be completed with a single tool and/or in a single step.

In a first aspect, a kit for installing a shower door is provided, the kit including a shower door header, comprising, an elongated body extending lengthwise, the body including a sidewall including a first side facing a first direction, a second side facing a second direction opposite of the first direction, a top portion, and a bottom portion, a first arm orthogonally extending from the first side and top portion of the sidewall, a second arm orthogonally extending from the second side and top portion of the sidewall, a guide disposed on the bottom portion of the sidewall, and an anti jump element disposed on the sidewall and disposed between the arms and the guide; a wall jamb; a shower header retainer, comprising: a retainer element including an interface side, a narrowed wall jamb securing element extending downwardly from the retainer element and configured to be securely received in the wall jamb, and one or more plugs extending orthogonally from the interface side of the retainer element, the one or more plugs configured to be received in one or more open cavities of the shower door header; a shower door catcher, comprising: an elongated body comprising a door catch arm side and a clip side opposite on the body from the arm side, a door catch arm outwardly extending from the door catch arm side, and one or more clips disposed on the clip side; a roller assembly, comprising: a roller including a bushing interface and an aperture, the bushing interface including a slot and a recessed portion, a bushing including a bushing protrusion configured to engage with the slot of the bushing interface of the roller, wherein the bushing includes a hole configured to align with the aperture when the bushing is engaged with the roller, and a hand fastener including a body having one or more wings, a sleeve configured to be received in the recessed portion of the roller, wherein the sleeve extends orthogonally from the body and is configured to at least partially circumscribe the bushing when the hand fastener is engaged with the bushing, a passage configured to align with the hole and the aperture when the hand fastener is engaged with the bushing and the roller, and a tool fastener configured to pass through the hole, aperture, and passage and releasably secure the roller, the bushing, and the hand fastener; a shower threshold, comprising an extendable elongated body comprising a pair of ends; a corner bracket, comprising: an elongated base including a wall jamb side and a threshold side disposed oppositely on the base from the wall jamb side, a tapered stem extending upwardly from the wall jamb side of the base, the tapered stem including a door side, a wall side, and a stem protrusion extending from the stem on the wall side, and a stem aperture extending longitudinally through the door side, the wall side, and the stem protrusion, and a threshold interface element disposed at the threshold side of the base, the threshold interface configured to receive one of the pair of ends of the shower threshold.

In a second aspect, a shower door header is provided, the shower door header including an elongated body extending lengthwise, the body including a sidewall including a first side facing a first direction, a second side facing a second direction opposite of the first direction, a top portion, and a bottom portion; a first arm orthogonally extending from the first side and top portion of the sidewall; and a second arm orthogonally extending from the second side and top portion of the sidewall; a guide disposed on the bottom portion of the sidewall; and an anti jump element disposed on the sidewall and disposed between the arms and the guide.

In a third aspect, a shower door catcher is provided, the shower door catcher including an elongated body comprising a door catch arm side and a clip side opposite on the body from the arm side; a door catch arm outwardly extending from the door catch arm side; and one or more clips disposed on the clip side.

In a fourth aspect, a roller assembly is provided, the roller assembly including a roller including a bushing interface and an aperture, the bushing interface including a slot and a recessed portion; a bushing including a bushing protrusion configured to engage with the slot of the bushing interface of the roller, wherein the bushing includes a hole configured to align with the aperture when the bushing is engaged with the roller; and a hand fastener including a body having one or more wings; a sleeve configured to be received in the recessed portion of the roller, wherein the sleeve extends orthogonally from the body and is configured to at least partially circumscribe the bushing when the hand fastener is engaged with the bushing; a passage configured to align with the hole and the aperture when the hand fastener is engaged with the bushing and the roller; and a tool fastener configured to pass through the hole, aperture, and passage and releasably secure the roller, the bushing, and the hand fastener.

In a fifth aspect, a kit for installing a shower door is provided, the kit including a shower door header, comprising: an elongated body including a top portion; opposing wedge-shaped fingers disposed on the top portion, the opposing fingers defining an aperture having a trapezoidal profile; a wall jamb; a shower header retainer, comprising: a retainer element including an interface side; a narrowed wall jamb securing element extending downwardly from the retainer element and configured to be securely received in a wall jamb; and one or more plugs extending orthogonally from the interface side of the retainer element, the one or more plugs configured to be received in one or more open cavities of a header; a shower door catcher, comprising: a base comprising a bottom portion, bumper side, and an inwardly curving surface on the bumper side; a bumper disposed on the bumper side; opposing armatures laterally extending from the bumper side and the bottom portion; and a guide downwardly extending from the bottom portion; a roller assembly, comprising: an axle including an outer end, an inner end, a flat portion disposed between the outer and inner ends, an inner boss disposed proximate to the inner end, and an outer boss disposed proximate to the inner boss and toward the outer end; an outer cover configured to be releasably secured with the outer end of the axle; an outer roller including an outer roller aperture configured to receive the axle; a guide element comprising a foot configured to be received in an aperture of a shower door header; the guide element comprising a guide element aperture having a profile of the indentation and configured to receive the axle; an inner roller including an inner roller aperture configured to receive the axle; a ring including a ring aperture configured to receive the axle; the ring configured to be securely received on the outer boss; a lock element including a lock element aperture having a profile of the indentation and configured to receive the axle; a washer including a washer aperture configured to receive the axle; a door securing element including a door securing element aperture configured to receive the axle; an axle cap including an axle cavity configured to receive the inner end of the axle; and an inner cover configured to be releasably secured with one or more of the axle cap; a shower threshold, comprising: an extendable elongated body comprising a pair of ends; and a corner bracket, comprising: an elongated base including wall jamb side and a threshold side disposed oppositely on the base from the wall jamb side; a tapered stem extending upwardly from the wall jamb side of the base, the tapered stem including a door side, a wall side, and a stem protrusion extending from the stem on the wall side; and a stem aperture extending longitudinally through the door side, the wall side, and the stem protrusion; and a threshold interface element disposed at the threshold side of the base, the threshold interface configured to receive one of the pair of ends of the shower threshold.

In a sixth aspect, a shower door header is provided, the shower door header including an elongated body including a top portion; and opposing wedge-shaped fingers disposed on the top portion, the opposing fingers defining an aperture having a trapezoidal profile.

In a seventh aspect, a shower door catcher is provided, the shower door catcher including a base comprising a bottom portion, bumper side, and an inwardly curving surface on the bumper side; a bumper disposed on the bumper side; opposing armatures laterally extending from the bumper side and the bottom portion; and a guide downwardly extending from the bottom portion.

In an eighth aspect, a roller assembly is provided, the roller assembly including an axle including an outer end, an inner end, a flat portion disposed between the outer and inner ends, an inner boss disposed proximate to the inner end, and an outer boss disposed proximate to the inner boss and toward the outer end; an outer cover configured to be releasably secured with the outer end of the axle; an outer roller including an outer roller aperture configured to receive the axle; a guide element comprising a foot configured to be received in an aperture of a shower door header; the guide element comprising a guide element aperture having a profile of the indentation and configured to receive the axle; an inner roller including an inner roller aperture configured to receive the axle; a ring including a ring aperture configured to receive the axle; the ring configured to be securely received on the outer boss; a lock element including a lock element aperture having a profile of the indentation and configured to receive the axle; a washer including a washer aperture configured to receive the axle; an eccentric bushing including an aperture configured to receive the axle; an axle cap including an axle cavity configured to receive the inner end of the axle; and an inner cover configured to be releasably secured with the axle cap.

In a ninth aspect, a shower header retainer is provided, the shower header retainer including a retainer element including an interface side; a narrowed wall jamb securing element extending downwardly from the retainer element and configured to be securely received in a wall jamb; and one or more plugs extending orthogonally from the interface side of the retainer element, the one or more plugs configured to be received in one or more open cavities of a header.

In a tenth aspect, a corner bracket is provided, the corner bracket including an elongated base including wall jamb side and a threshold side disposed oppositely on the base from the wall jamb side; a tapered stem extending upwardly from the wall jamb side of the base, the tapered stem including a door side, a wall side, and a stem protrusion extending from the stem on the wall side; and a stem aperture extending longitudinally through the door side, the wall side, and the stem protrusion; and a threshold interface element disposed at the threshold side of the base, the threshold interface element configured to slidably receive a shower door threshold.

In an eleventh aspect, a shower door threshold is provided, the shower door threshold including an extendable elongated body comprising a pair of ends each configured to be securely received in a threshold interface element of a corner bracket.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

Further features and advantages can be ascertained from the following detailed description that is provided in connection with the drawings described below.

DETAILED DESCRIPTION

Figure 1:
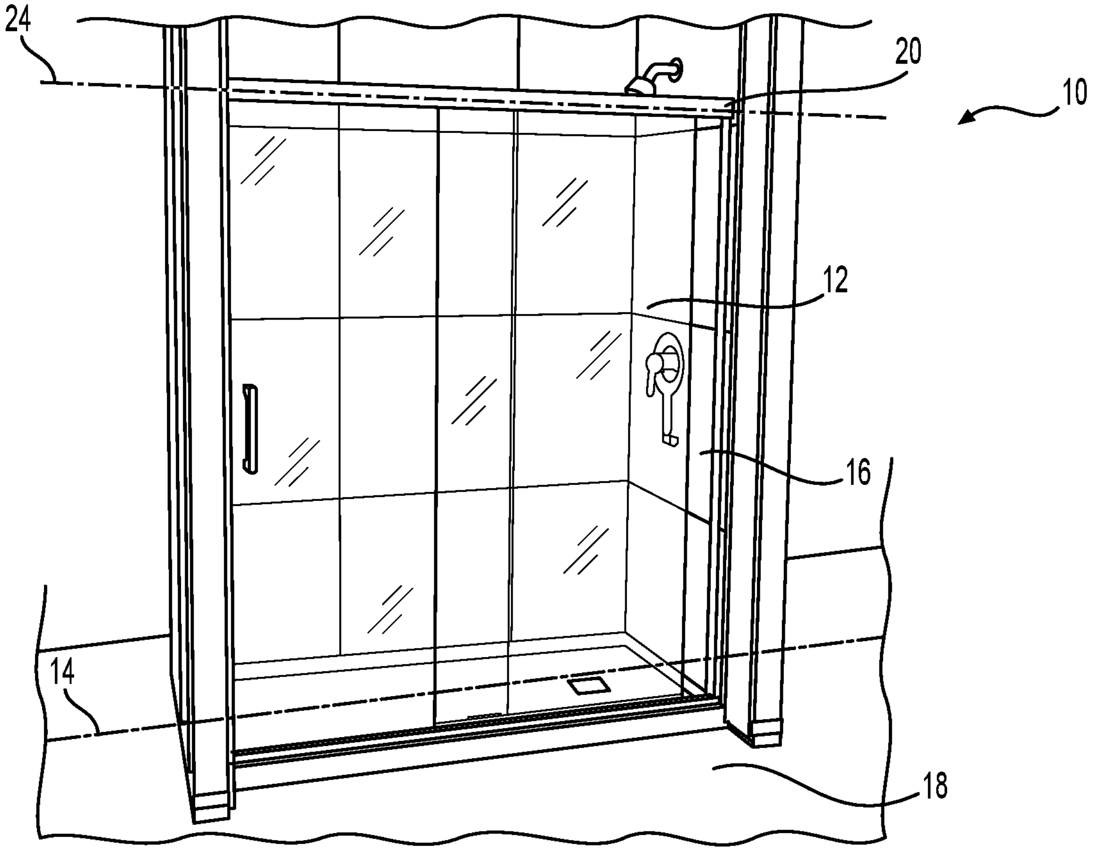
FIG. 1 is a front perspective view of a shower door frame assembled in accordance with an embodiment of the present disclosure.
Figure 2:
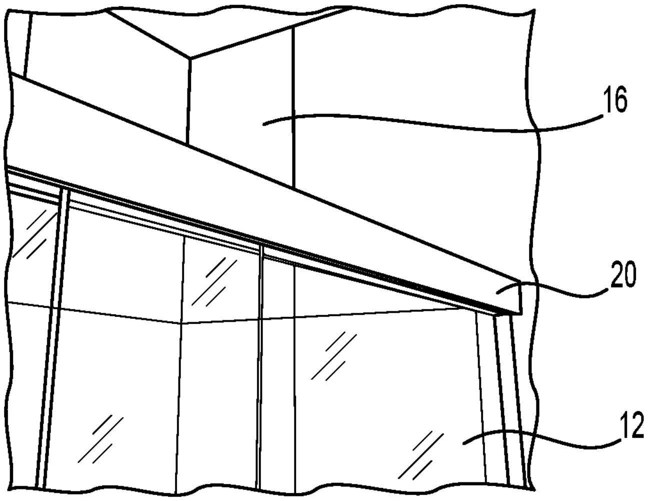
FIG. 2 is a front perspective view of a shower door header attached to the shower door frame according to an embodiment of the present disclosure.
Figure 3:
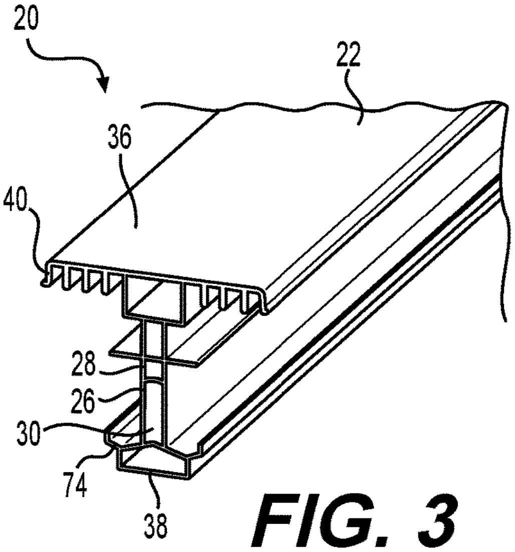
FIG. 3 is a perspective view of the shower door header according to an embodiment of the present disclosure.

Reference now will be made in detail to the embodiments of the present disclosure. It will be apparent to those of ordinary skill in the art that various modifications and variations can be made to the teachings of the present disclosure without departing from the scope of the disclosure. For instance, features illustrated or described as part of one embodiment can be used with another embodiment to yield a further embodiment.

Thus, it is intended that the present disclosure covers such modifications and variations that come within the scope of the appended claims and their equivalents. Other objects, features, and aspects of the present disclosure are disclosed in or are apparent from the following description. It is to be understood by one of ordinary skill in the art that the present disclosure is a description of exemplary embodiments only and is not intended as limiting the broader aspects of the present disclosure.

For the sake of clarity, not all reference numerals are necessarily present in each drawing Figure. In addition, positional terms such as "upper," "lower," "side," "top," "bottom," "vertical," "horizontal," etc. refer to the handle when in the orientation shown in the drawings. The skilled artisan will recognize that the handle can assume different orientations when in use.

Referring to FIGS. 1-65D, an apparatus 10, such as a shower door frame kit, is disclosed. The apparatus 10 may be provided as a kit with one or more components thereof or only individual component(s). The apparatus 10 can be installed with one or more glass shower doors 12 such that the glass shower doors 12 are slidable (i.e., translatable) along a shower door axis 14. One, or each, of the glass shower doors 12 may be slidable. In some embodiments, one of the glass shower doors 12 may be stationary. Advantageously, the apparatus 10 enables secure and convenient installation of the glass shower doors 12, while keeping water that may escape a shower area 16 to a surrounding area 18 to a minimum. While the apparatus 10 has been exemplified for installation with the glass shower doors 12, it should be appreciated that the various components disclosed herein may be used in conjunction with other types of shower door assemblies having different configurations (for example, a different number of door panels and door panels having different shapes and sizes) and made of different materials (for example, partially made of glass and/or additional or different sections of materials, such as metal, wood, plastic, composite, or any other suitable material).

The apparatus 10 may include a shower door header 20. In some embodiments, the shower door header 20 may have a concealed design, as shown in FIGS. 1-6D. The shower door header 20 may comprise an elongated body 22. The elongated body 22 may be configured and dimensioned such that it extends along a shower door header axis 24. The shower door header axis 24 may be parallel with the shower door axis 14, including such that the shower door header axis 24 and the shower door axis 14 may be in the same plane.

The body 22 includes a sidewall 26. The sidewall 26 may be disposed centrally on the body 22. The sidewall 26 may be comprised of any number of sidewall walls 28, such as one, two, three, or four. One or more open cavities 30 may be disposed in the sidewall 26, such as between the sidewall walls 28. Beneficially, the one or more open cavities 30 may enable the sidewall 26 to have a sufficient width to properly space the glass shower doors 12 from each other when installed while minimizing the material needed to construct the header 20 as well minimizing weight of the header 20, which is important for easy installation.

The sidewall 26 may comprise a first side 32 facing a first direction and a second side 34 facing a second direction that is opposite of the first direction. When the header 20 is installed, the first direction may face the shower area 16, and the second direction may face the surrounding area 18. The sidewall 26 may comprise a top portion 36 and a bottom portion 38.

Figure 4:
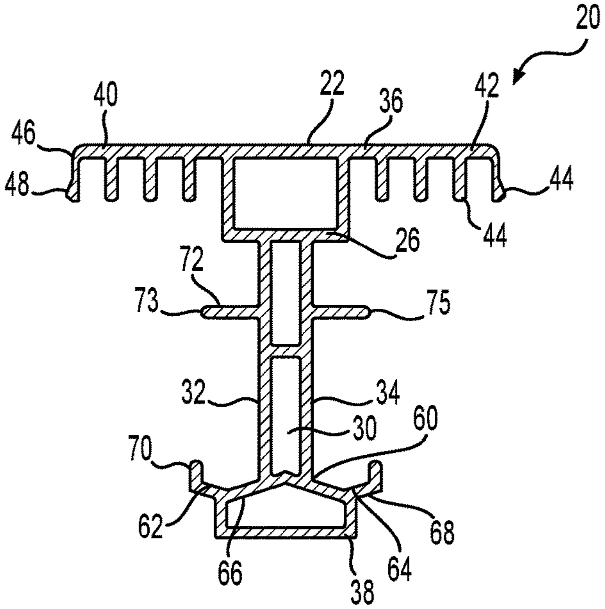
FIG. 4 is a cross-sectional view of the shower door header shown in FIG. 3.

A first arm 40 may extend, such as orthogonally, from the first side 32 and top portion 38 of the sidewall 26. A second arm 42 may extend, such as orthogonally, from the second side 34 and top portion 36 of the sidewall 26. The first arm 40 and the second arm 42 may each include one or more ribs 44 extending downwardly. The one or more ribs 44 may comprise an outer rib 46 comprising an outwardly extending protuberance 48. For example, the outer rib 46 having the outwardly extending protuberance 48 may be positioned at the outermost location on each of the first arm 40 and the second arm 42, as illustrated in FIG. 4.

The apparatus 10 may include an elongated cover 50 configured to be disposed over the elongated body 22. The cover 50 may comprise a cover base 52 and opposing side supports 54 extending from the cover base 52. The cover 50 may include opposing extensions 56 that extend inwardly from the opposing side supports 54, the opposing extensions 56 configured to friction fit with the outwardly extending protuberance 48 of the shower door header 20. Each of the opposing side supports 54 may comprise an inwardly extending lip 58 that extends inwardly from the side supports 54. The inwardly extending lips 58 may be disposed oppositely on the side supports 54 from the cover base 52.

Figure 6A:
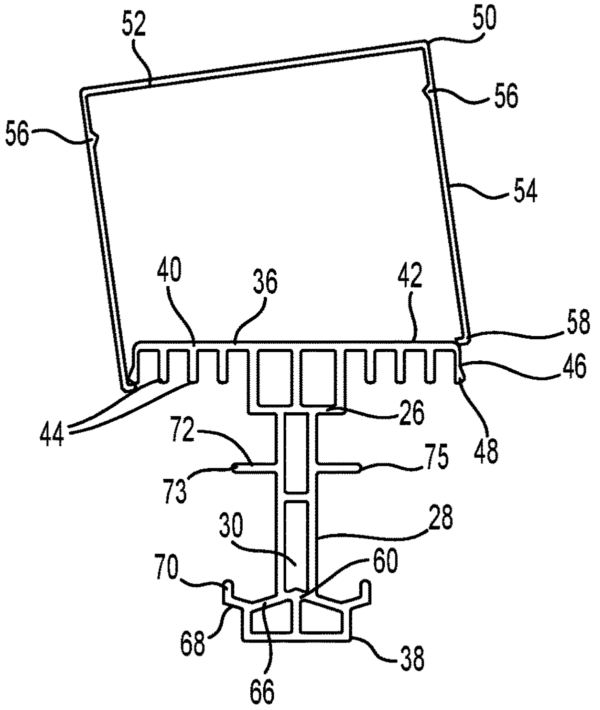
FIGS. 6A-6D are side views of a header cover being secured over the shower door header shown in FIG. 4.
Figure 6B:
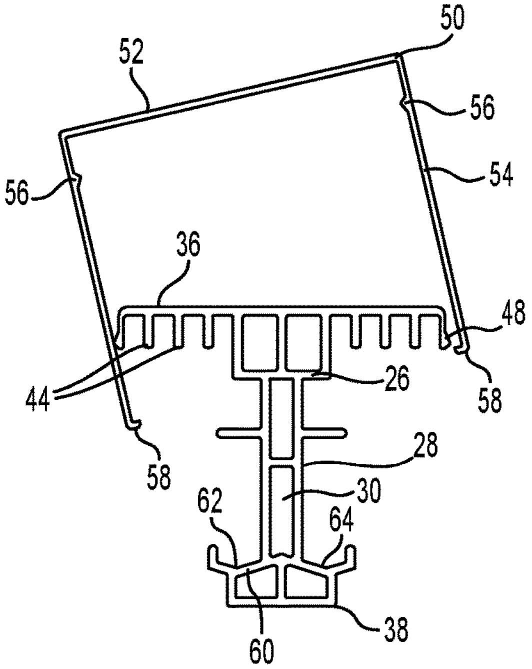
Figure 6C:
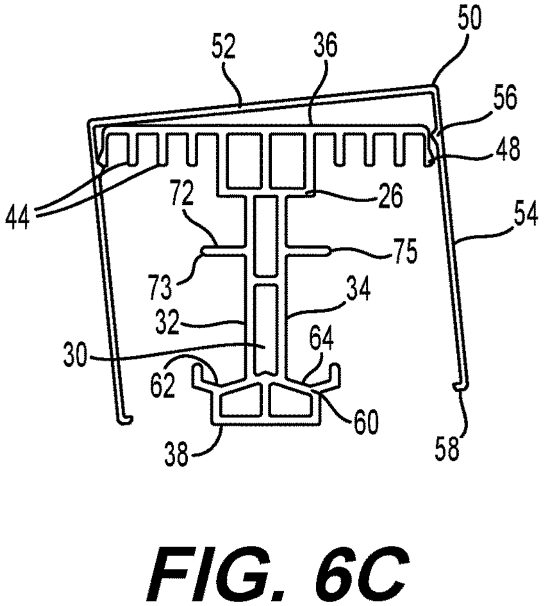
Figure 6D:
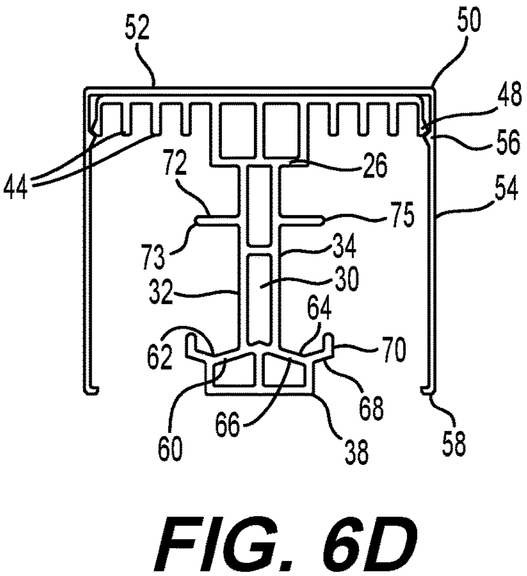
Figure 7:
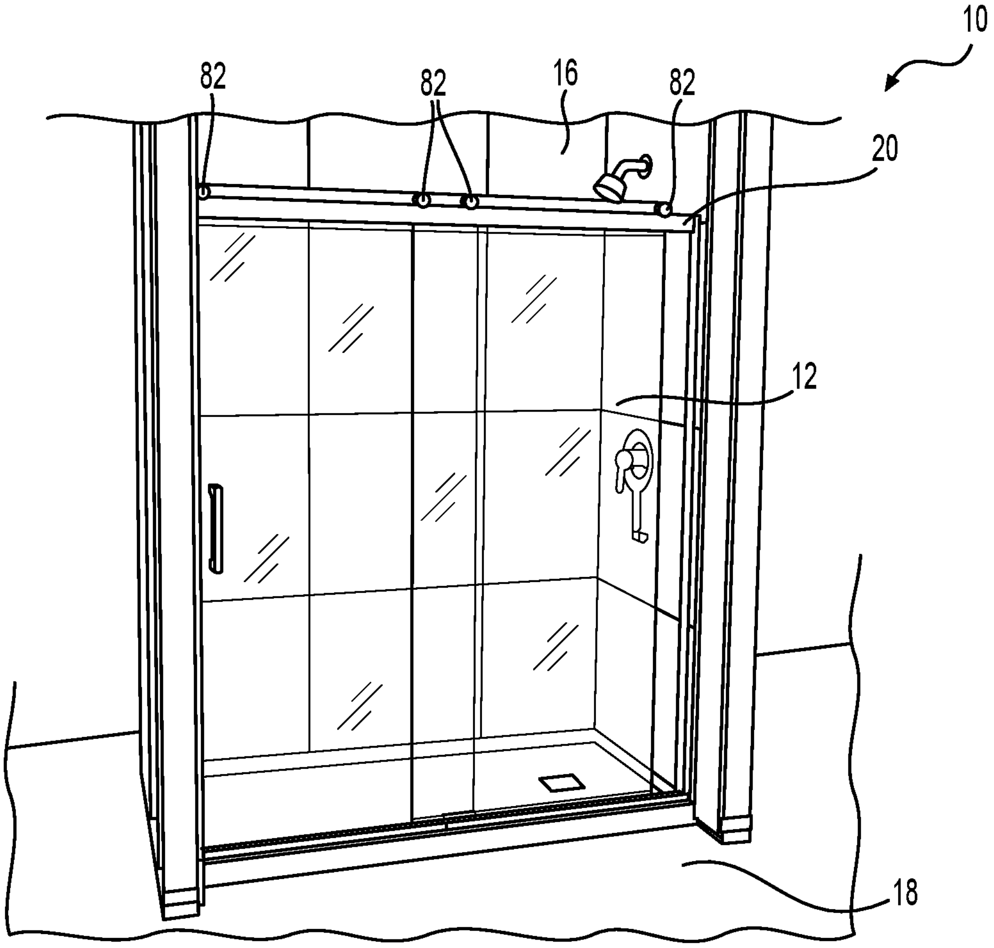
FIG. 7 is a front perspective view of a shower door frame assembled in accordance with another embodiment of the present disclosure.
Figure 8:
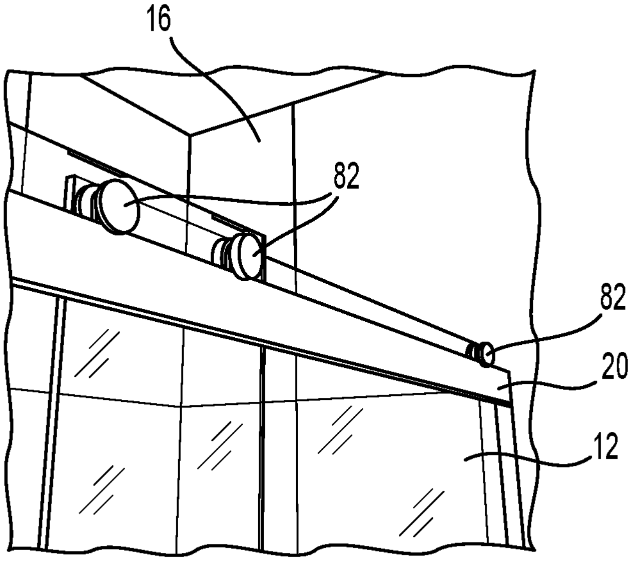
FIG. 8 is a front perspective view of the shower door header attached to the shower door frame according to another embodiment of the present disclosure.
Figure 9:
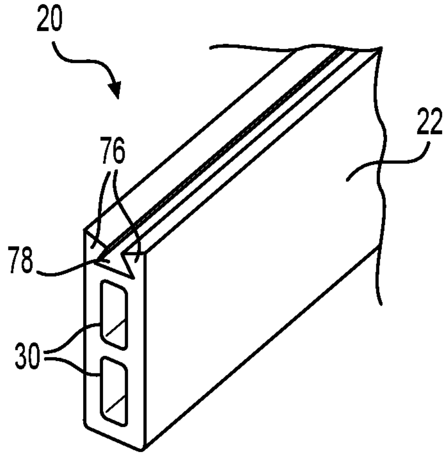
FIG. 9 is a front perspective view of the shower door header according to another embodiment of the present disclosure.
Figure 10:
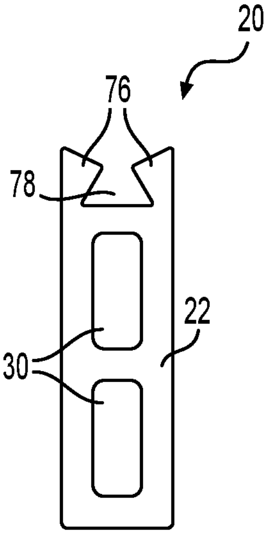
FIG. 10 is a side view of the shower door header shown in FIG. 9.
Figure 11:
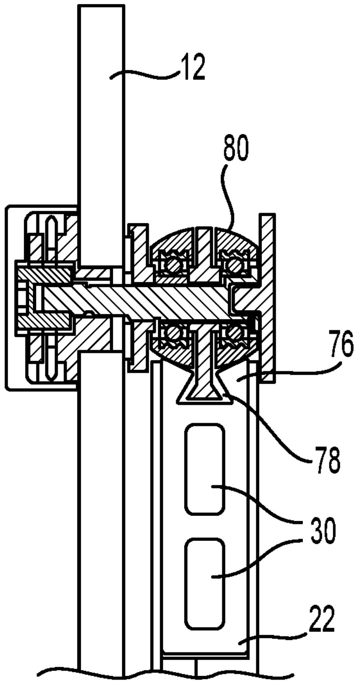
FIG. 11 is a partial cutaway view of the shower door header shown in FIG. 9 having a roller assembly engaged therewith.
Figure 12:
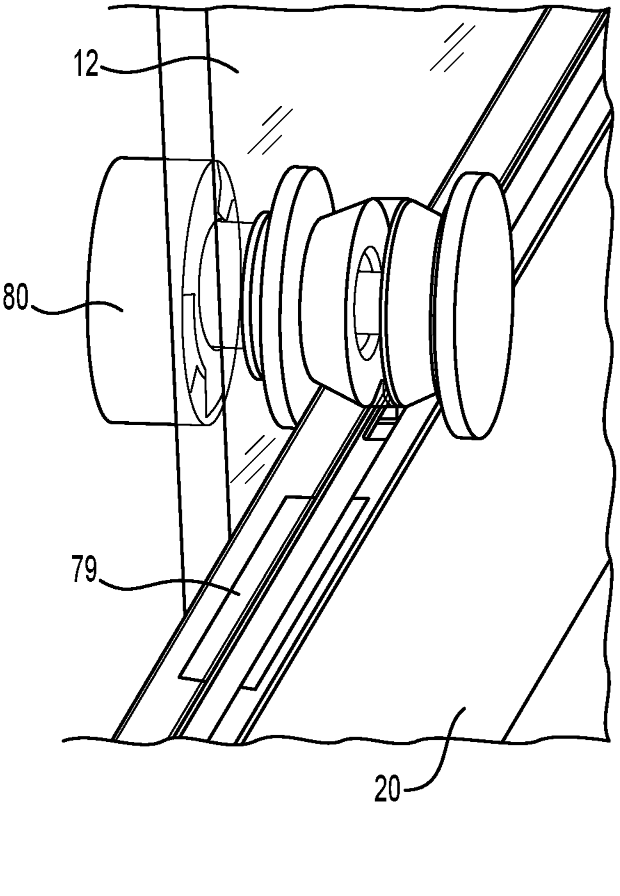
FIG. 12 is a perspective view of the roller assembly engaged with a shower door header according to an embodiment of the present disclosure.
Figure 13:
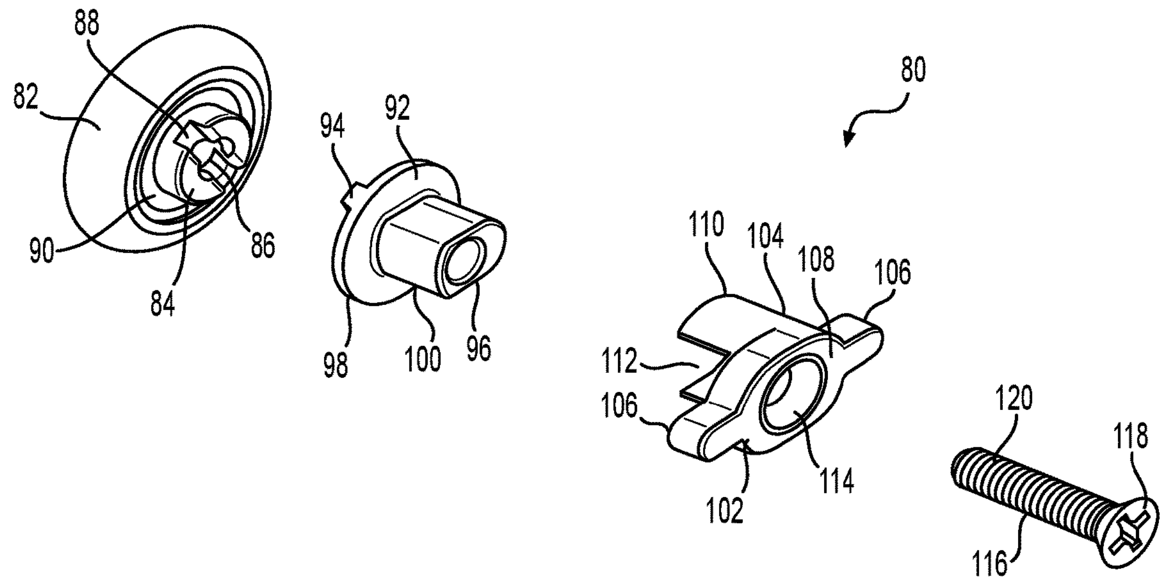
FIG. 13 is an exploded view of the roller assembly according to an embodiment of the present disclosure.
Figure 14:
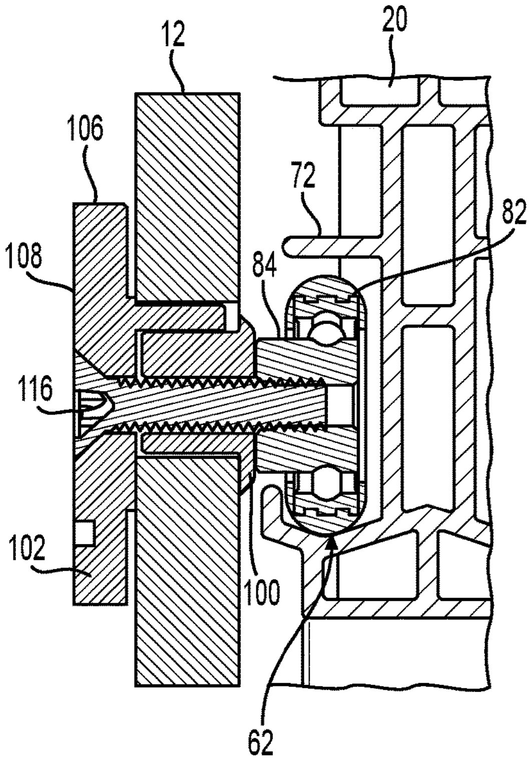
FIG. 14 is a cutaway view of the roller assembly engaged with the shower door header according to an embodiment of the present disclosure.
Figure 15:
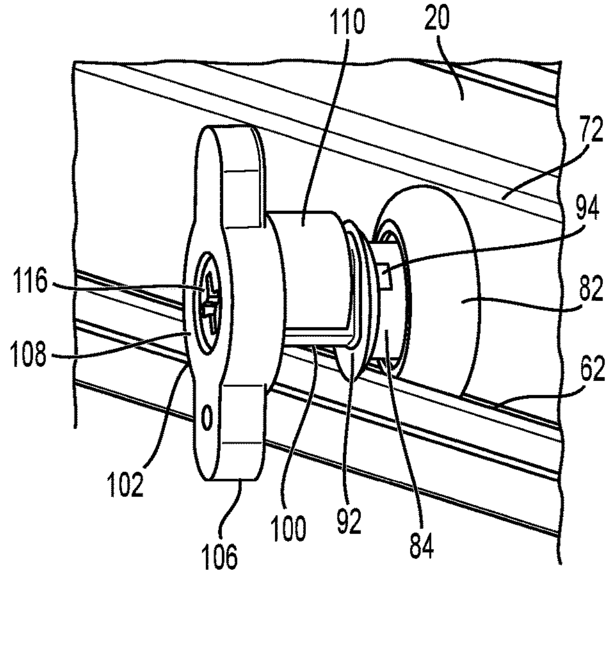
FIG. 15 is a perspective view of the roller assembly engaged with the shower door header according to an embodiment of the present disclosure.

Advantageously, opposing extensions 56 and lips 58 create a "double snap" feature such that when the cover 50 is being secured with (e.g., installed with) the shower door header 20, the lips 58 create a first friction fit with outwardly extending perturbances 48 of the header 20 to assist the installer aligning the cover 50 with the header 20, as shown in FIG. 6A. The cover 50 may be moved past (e.g., downwardly) this first friction fit position (as shown in FIGS. 6B and 6C) such that the opposing extensions 56 engage, and friction fit with, with the header 20, as shown in FIG. 6D. This second friction fit, or "snap," indicates to the installer that cover is secure and in the properly installed position.

The elongated body 22 may include a guide 60 disposed on the bottom portion 38 of the sidewall 26 for guiding movement of the sliding, or translating, glass shower doors 12 along the elongated body 22 of the header 20. The guide 60 may comprise a first channel 62 disposed lengthwise along the first side 32 of the sidewall 26. The guide 30 may comprise a second channel 64 disposed lengthwise along the second side 34 of the sidewall 36. The channels 62, 64 may each be configured such as to cooperatively receive a roller, wheel, or boss of a glass shower door, such as those described herein. The channels 62, 64 may each comprise, or be defined by, a first downwardly extending leg 66 and a second downwardly extending leg 68. The first leg 66 extends from the sidewall 26 and the second leg 68 extends from the first leg 66 oppositely from the sidewall 26. A channel stanchion 70 for securing an installed roller, wheel, or boss of a glass door may extend upwardly from the second leg 68 and be disposed on the second leg 68 opposite from the first leg 66.

Figure 5:
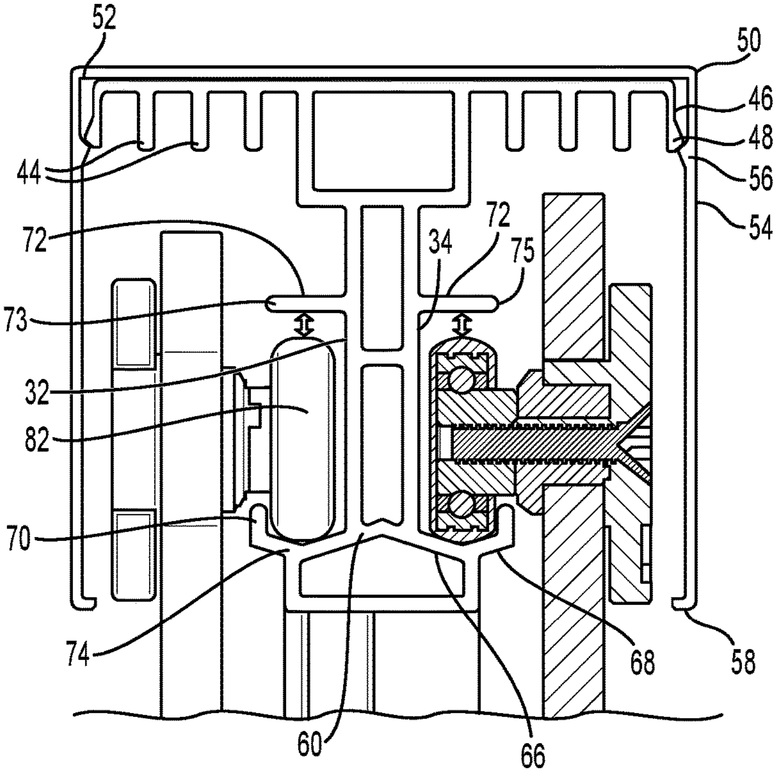
FIG. 5 is a partial cutaway view of the shower door header having a roller assembly engaged therewith according to an embodiment of the present disclosure.

As shown in FIG. 5, the body 22 may include an anti jump element 72 for preventing an installed shower door roller, wheel, or boss of a glass shower door 12 (such as those disclosed herein) from being "lifted off" the guide 60. In particular, the anti jump element 72 is advantageous, as it prevents the door from becoming unsecured due to an upward force on the door, which while not a typical force applied to shower doors 12, may nevertheless sometimes be applied, such as during the cleaning of the door. The anti jump element 72 may be disposed between the first and second arms 40, 42 and the guide 60 (i.e., disposed between the bottom portion 36 and the top portion 38). The anti jump element 72 may comprise a first protrusion 73 extending orthogonally from the first side 32 of the sidewall 26 in the first direction, a second protrusion extending orthogonally from the second side 34 of the sidewall 26 in the second direction, or both. The protrusions 73, 75 may be spaced a distance that is sufficiently greater than a height of a shower door roller, wheel, or boss to allow the roller, wheel, or boss to translate freely but not allow the roller, wheel, or boss to slide off the guide 60. The first leg 66, the second leg 68, and the stanchion 70 may define a groove 74 configured to receive a shower door roller, wheel, or boss such that the shower door roller, wheel, or boss is movable lengthwise along the elongated body 22 via the groove 74.

In some embodiments, the shower door header 20 may have an unconcealed design, as shown in FIGS. 7-18. In aspects where the header 20 is unconcealed (i.e., partially revealed or visible), the elongated body 22, of the header 20 may comprise the sidewall 26 including the top portion 38 and opposing wedge-shaped fingers 76 disposed on the top portion 38. The wedge-shaped fingers 76 may define a header aperture 78. The header aperture 78 may have a trapezoidal profile, such as an isosceles trapezoidal profile. The wedge-shaped fingers 76 may be shaped to cooperatively receive a guide/foot of a guide element on a roller, wheel, or boss of a shower door (such as those disclosed herein), and/or a guide of a shower door catcher, such as those disclosed herein. The elongated body 22 may have a rectangular profile. In some embodiments, the apparatus 10 includes a roller bumper 79 with a boss at a bottom portion (not shown) shaped to be received in the header aperture 78, such as shaped complementary to the isosceles trapezoidal profile of the header aperture 78. Thus, the roller bumper 79 may be secured between more than one roller assemblies 80 such that the roller bumper 79 prevents the roller assemblies 80 from contacting one another and maintains their proper spacing.

The shower door header 20 may be rigid and constructed of any suitable material, including steel, aluminum, alloys, and polymers. The shower door header 20 may be integrally formed or separately formed and attached.

The apparatus 10 may include a roller assembly 80 for translating the shower door(s) 12 along the shower door header 20. Advantageously, the roller assemblies 80 disclosed herein allow for smooth movement of the glass shower door(s) 12 while being mechanically strong. Indeed, it is believed that the roller assembly 80 of the present disclosure can withstand over 10,000, 15,000, 20,000, 30,000, 35,000, or 40,000 open and closing movements of a shower door. In one working example, the roller assembly 80 of the present disclosure was found to withstand 36,500 open and closing movements. In embodiments of the header 20 that are concealed (FIGS. 1-7), the roller assembly may be fully or partially obscured from view when the roller assembly 80 is installed with a shower door 12.

As shown in FIGS. 5 and 11-16, in one aspect, the roller assembly 80 may include a roller or wheel 82. The roller 82 may be configured and dimensioned to cooperatively fit and roll along a guide of a shower header, such as one of the channels 62, 64 of the shower door header 20. The roller 82 may include a bushing interface 84 and an aperture 86, the bushing interface 84 having a slot 88 and a recessed portion 90. In some embodiments, the aperture 86 may be threaded. The recessed portion 90 may be disposed circumferentially around the bushing interface 84.

The roller assembly 80 may include a bushing 92 configured to engage the bushing interface 84 of the roller 82. The bushing 92 may have an eccentric profile. The bushing 92 may include a bushing protrusion 94 configured to engage with the slot 88 of the bushing interface 84 of the roller 82. The bushing 92 may include a hole 96 that is configured to align with the aperture 86 when the bushing 92 is engaged with the roller 82. The hole 96 of the bushing 92 may be threaded or unthreaded. The bushing 92 may comprise a disk 98 from which the bushing protrusion 94 extends and a central knob 100 extending from the disk 98 oppositely from the bushing protrusion 94.

The roller assembly 80 may comprise a hand fastener 102 for engaging the bushing 92. The hand fastener 102 makes it easy and convenient to adjust the roller assembly 80 by allowing the installer to make adjustments with the use of one or more fingers. The hand fastener 102 may comprise a hand fastener body 104 that includes one or more wings 106 extending from a passage side 108. The one or more wings 106 may include a pair of wings 106 oppositely disposed on, and extending away from, the body 104. The hand fastener 102 may include a sleeve 110 configured to be cooperatively received in the recessed portion 90 of the roller 82. The sleeve 110 may extend orthogonally from the body 104 and be configured to at least partially circumscribe, or surround, the bushing 92, particularly the central knob 100. The sleeve 110 may be shaped to cooperatively receive the central knob 100. The sleeve 110 may include a sleeve gap 112 such that the sleeve partially, rather than fully, circumscribes the bushing 92 when engaged with the bushing 92. The hand fastener 102 may comprise a passage 114 disposed on the passage side 108 and extending through the body 104 in a direction orthogonal to the direction in which the wings 106 extend. The passage 114 may be threaded or unthreaded. The passage 114 may be configured to align with the aperture 86 and the hole 96 when the hand fastener 102 is engaged with the roller 82 and the bushing 92. In some embodiments, when the roller 82 is rotated, the bushing 92 is configured such that it does not rotate.

The roller assembly 80 may comprise a tool fastener 116, such as a screw 118 or a bolt, that comprises cooperative threads 120 to engage and secure one or more of the threaded aperture 82, the threaded hole 96, and the threaded passage 114, thereby releasably securing the roller 82, the bushing 92, and the hand fastener 102. The tool fastener 116 may be shaped such that it is cooperatively received in one or more of the threaded aperture 82, the hole 96, and the passage 114.

Figure 16:
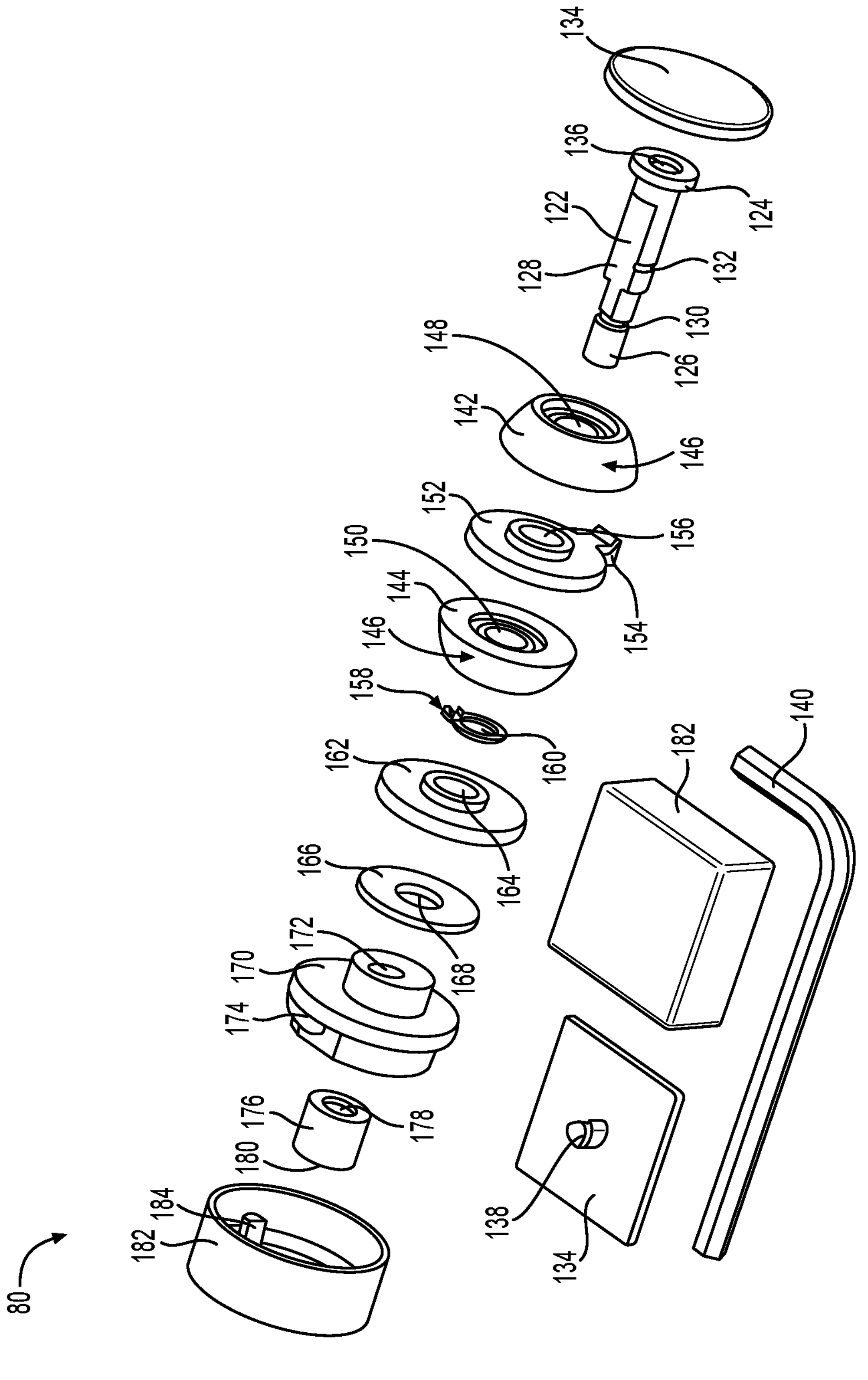
FIG. 16 is an exploded view of the roller assembly according to another embodiment of the present disclosure.

As discussed, in some embodiments, the roller assembly 80 may be configured such that it is not concealed, or partially exposed, from view when installed. Referring to FIG. 16, the roller assembly 80 may include an axle 122. The axle 122 may be disposed centrally through the roller assembly 80. The axle 122 may include an outer end 124 and an inner end 126 disposed oppositely on the axle 122 from the outer end 124. The outer end 124 may be described as the end proximate to surrounding area 18 of the shower area 16, and the inner end 126 may be described as the end proximate to the shower area 16, when the roller assembly 80 is installed with a shower door 12. The axle 122 may include a flat portion 128 disposed between the outer and inner ends 124, 126. The axle 122 may include an inner boss 130 extending around the axel and disposed proximate to the inner end 126. The axle 122 may include an outer boss 132 extending around the axle and disposed proximate to the inner boss 130 and toward the inner end 126 such that the outer boss 132 is positioned between the inner boss 130 and the outer end 124. Advantageously, the flat portion 128 allows some components disposed thereon to freely rotate when those components have a circular aperture, while rotationally securing other components that have an aperture profile that corresponds or cooperates with the flat portion 128 such as to engage the flat portion 128.

The roller assembly 80 may include an outer cover 134 configured to be releasably secured with the outer end 124 of the axle 122. In the illustrated embodiment, the outer cover 134 has a circular profile. However, the outer cover 134 may also have an oval profile, a rectangular profile, or a square profile. Two or more covers 134 may be provided in different profiles such that different cover profiles may be used depending on consumer or installer preference. The outer cover 134 may include a securing element 136 configured to operatively engage with and releasably secure an outer cooperative securing element 138 on the outer end 124 of the axle 122, such as via a friction fit.

The roller assembly 80 may include an outer roller 142 and an inner roller 144. Each of the rollers 142, 144 may include a curved surface 146 and an outer roller aperture 148 and an inner roller aperture 150, respectively. Each of the roller apertures 146, 148 may be configured to receive the axle 122 and have circular profiles so that the rollers 142, 144 can freely rotate around the axle 122.

The roller assembly 80 may include a guide element 152 configured to be disposed between the outer and inner rollers 142 and 144 on the axle 122. The guide element 152 may be dimensioned so that the outer and inner rollers 142 and 144 taper upwardly toward the guide element 152. The guide element 152 may comprise a foot 154, which also can be referred to as a guide, configured to be received in an aperture or groove of a shower door header, such as the header aperture 78. The guide element 152 may include a guide element aperture 156 configured to receive the axle 122. The guide element aperture 156 may have a profile that is cooperative and complementary with the profile of the axle 122 at the flat portion 128 such that the guide element 152 and the axle 122 are rotationally secure with one another. The roller assembly 80 may comprise a ring 158 configured to be disposed against the inner roller 144 away from the guide element 152. The ring 158 may have a ring aperture 160 having a circular profile such that the ring may securely engage (e.g., releasably friction fit) with the outer boss to laterally secure the rollers 142, 144 and the guide element 152 on the axle 122.

The roller assembly 80 may include a lock element 162 including a lock element aperture 164. The lock element aperture 164 may have a profile that is cooperative and complementary with the profile of the axle 122 at the flat portion 128 such that the lock element aperture 164 and the axle 122 are rotationally secure with one another. The roller assembly 80 may include a washer 166 including a washer aperture 168. The washer 166 and the lock element 164 may distribute force across an engaged shower glass door, such as the glass shower doors 12.

Figure 17:
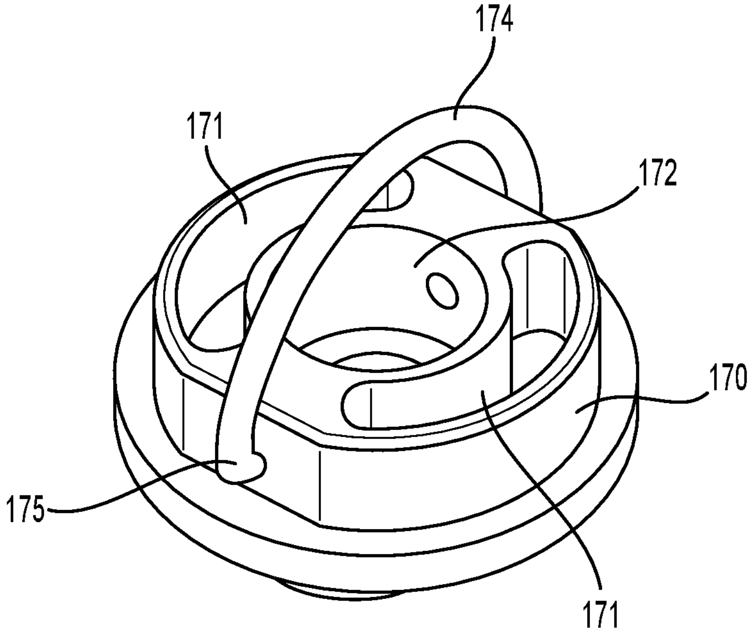
FIG. 17 is a front perspective view of an eccentric bushing of the roller assembly with a lever shown in an open position.
Figure 18:
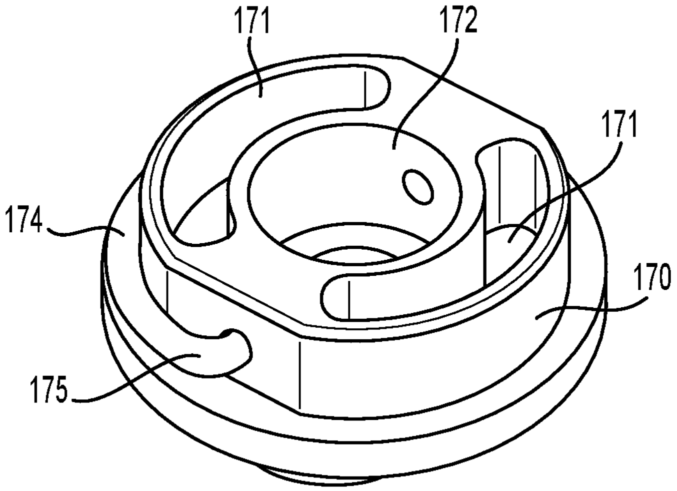
FIG. 18 is a front perspective view of the eccentric bushing of the roller assembly of FIG. 17 with the lever shown in a closed position.

The roller assembly 80 may include an eccentric bushing 170 including an aperture 172 configured to receive the axle 122. Advantageously, by rotating the eccentric bushing 170, the glass door 12 may be adjusted up or down after installation. This is particularly advantageous in instances where subtle adjustments need to be made for a satisfactory appearance of the installed shower door 12, such as when structures are not square or do not have level ceilings and floors. Moreover, the cam feature can allow an installer to account for installation errors in the apparatus 10 or minor variations in the structure, such as inconsistent grout distances, to achieve a desired and pleasing final installation appearance. The bushing 170 comprises a lever 174 that toggles between an open or unlocked position, shown in FIG. 17, and a closed or locked position, shown in FIG. 18. The lever 174 may be pivotable between the open and closed positions by hingedly rotating at a connection portion 175. In some embodiments, the bushing 170 is configured to raise and lower the glass door 12 after installation when the bushing 170 is rotated in the unlocked position, as illustrated in FIG. 17. The lever 174 may be used to ease handling when rotation of the bushing 170 is needed. If rotation of the bushing 170 is difficult by hand, a tool (such a screwdriver or a pen) may be inserted through the lever 174 to rotate the bushing 170.

The roller assembly 80 may include a securing element 176 having a threaded receptacle 178 configured to receive the inner end 126 of the axle 122. The securing element 176 may comprise an inner cooperative receptacle 180 disposed on the securing element 176 oppositely from the securing element receptacle 178. The inner cooperative receptacle 180 may be shaped to cooperatively receive a tool 140, such as a hex key, a wrench, or a screwdriver.

The roller assembly 80 may include an inner cover 182 configured to be releasably secured with the axle cap 176. The inner cover may include pins 184 configured to releasably friction fit within cavities 171 of the eccentric bushing 170. Advantageously, whatever the final orientation of the eccentric bushing 170, and therefore the cavities 171, are after installation, the cover 182 may always be positioned in a desired orientation. This is particularly advantageous when the cover 182 is not circular in profile, such as when the cover 182 has a square profile, as typically it is desired that the square cover 182 will have top and bottom sides that are parallel with the floor of a structure. The inner cover 182 may have a rectangular profile, a square profile, a round profile, or an oval profile. One or more inner covers 182 may be provided having different profiles such that the installer or consumer may use the desired profile. The profiles of the inner cover 182 and the outer cover 134 may be the same in shape. The axle 122 may have a length that is defined by the distance between the outer cover 134 and the inner cover 182 when the roller assembly 80 is assembled and installed. The covers 134, 182 provide a decorative finish to the ends of the roller assembly 80 when the roller assembly 80 is installed with the glass shower door 12.

The apparatus 10 may include a shower header retainer 186, as shown in FIGS. 19A-22, for securing and supporting a shower door header, such as the header 20. The shower header retainer 186 includes a retainer element 188 including an interface side 190 for interfacing with the header 20. Stress forces are notated (e.g., by arrows) in, for example, FIG. 19B. The retainer element 188 may comprise one or more plugs 192. The one or more plugs 192 may be positioned on the interface side 190 of the retainer element 188. The one or more plugs 192 may be configured to be received (e.g., removably secured via a friction fit) in the one or more cavities 30 of the header 20. In the illustrated embodiment of FIGS. 19A-22, two plugs 192 are positioned in parallel with the interface side 190 and two plugs 192 are positioned orthogonally with the interface side 190 such that each of the plugs 192 may be received within the cavities 30 illustrated on the header 20. However, as will be apparent to one of ordinary skill in the art, the number and positioning of the plugs 192 may vary depending on the configuration of the cavities 30 on the header 20. The retainer element 188 may comprise one or more door catcher openings 193, such as one, two, three, four, or more openings 193 disposed around the plugs 192. The apparatus may include a wall jamb 194. The wall jamb 194 may have one or more apertures 200. The shower header retainer 186 may include a narrowed wall jamb securing element 196 for securing the retainer 186 with the wall jamb 194. The narrowed wall jamb securing element 196 may extend downwardly from the retainer element 188 and be configured to be securely received in the wall jamb 194.

Figure 19A:
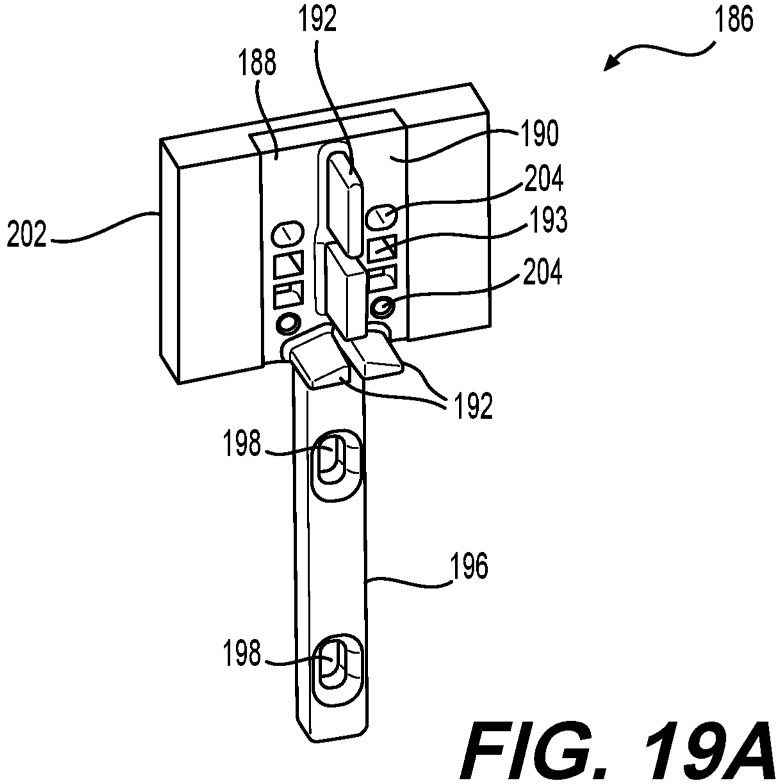
FIG. 19A is a front perspective view of a shower header retainer engaged with a bumper according to one embodiment of the present disclosure.
Figure 19B:
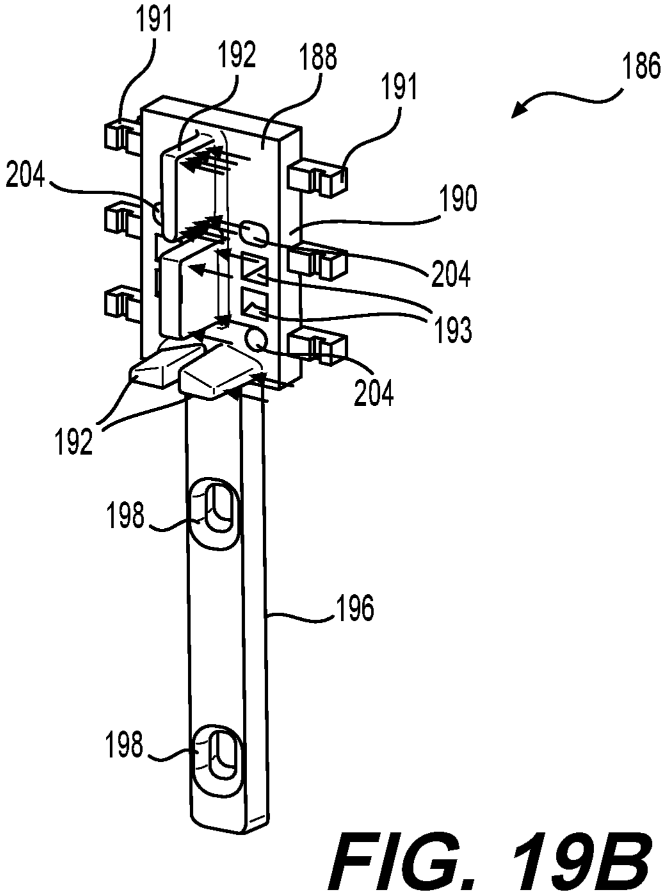
FIG. 19B is a front perspective view of a shower header retainer, notating exemplary stress forces, according to an embodiment of the present disclosure.
Figure 20:
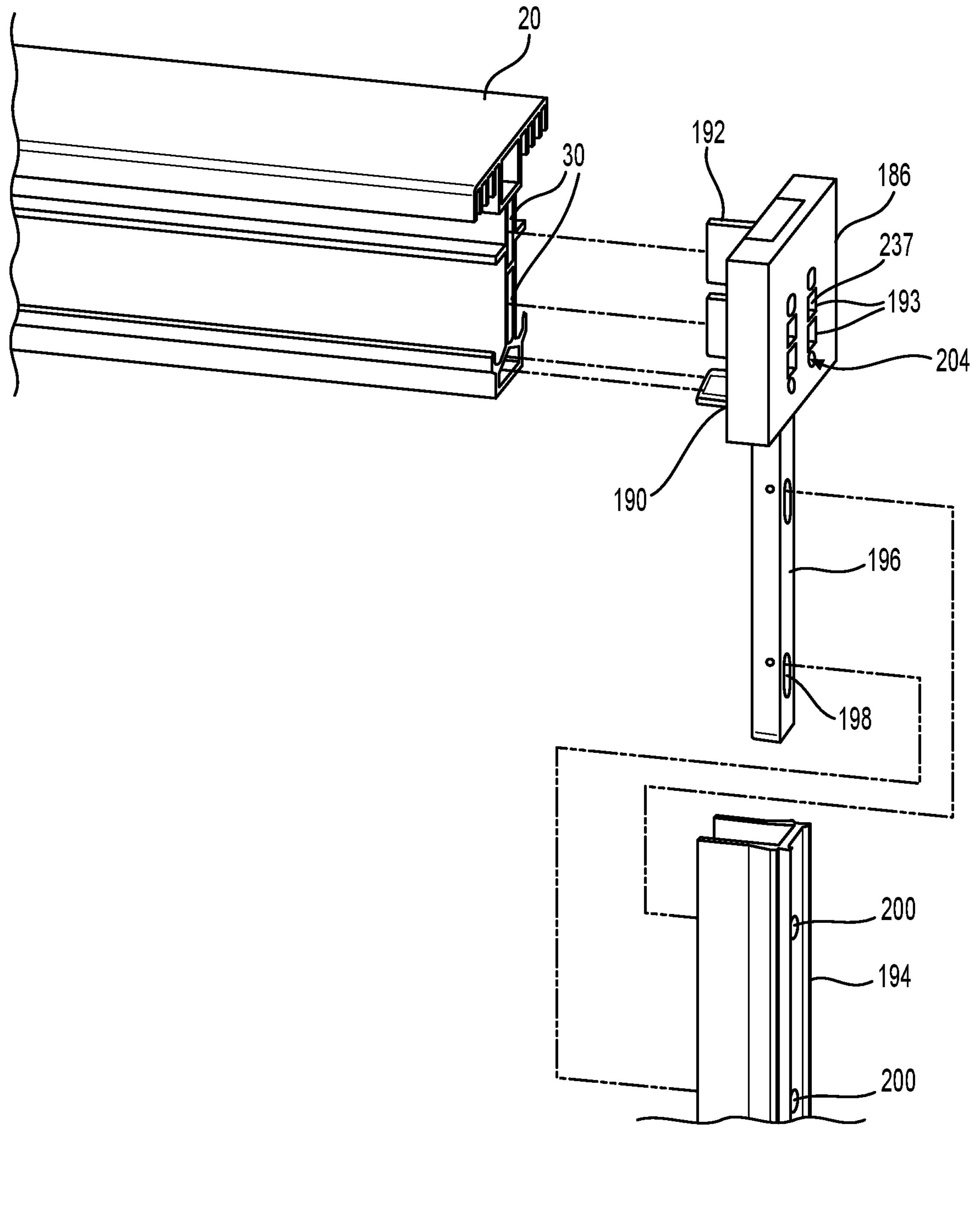
FIG. 20 is an exploded view of an assembly of the shower header retainer, the shower door header, and a wall jamb according to one embodiment of the present disclosure.
Figure 21:
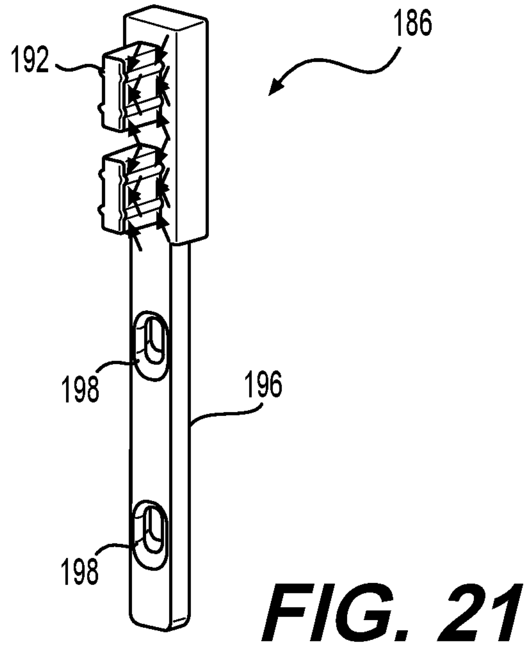
FIG. 21 is a front perspective view of the shower header retainer according to another embodiment of the present disclosure.
Figure 22:
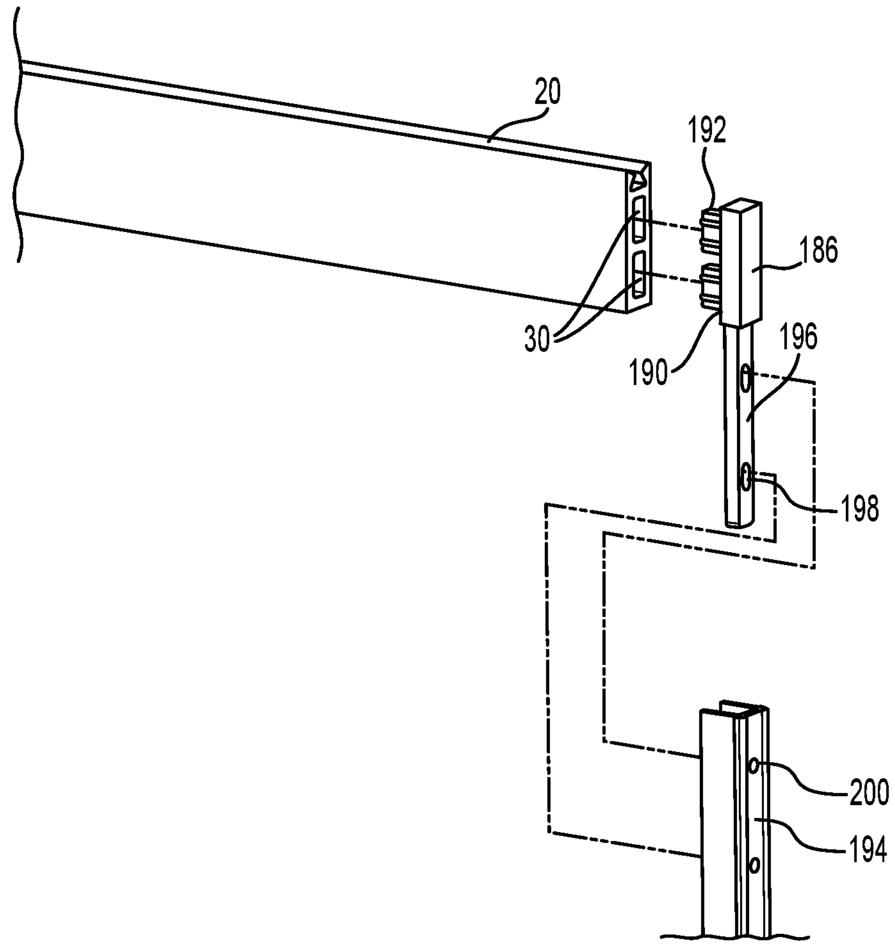
FIG. 22 is an exploded view of an assembly of the shower header retainer, the shower door header, and the wall jamb according to another embodiment of the present disclosure.
Figure 23:
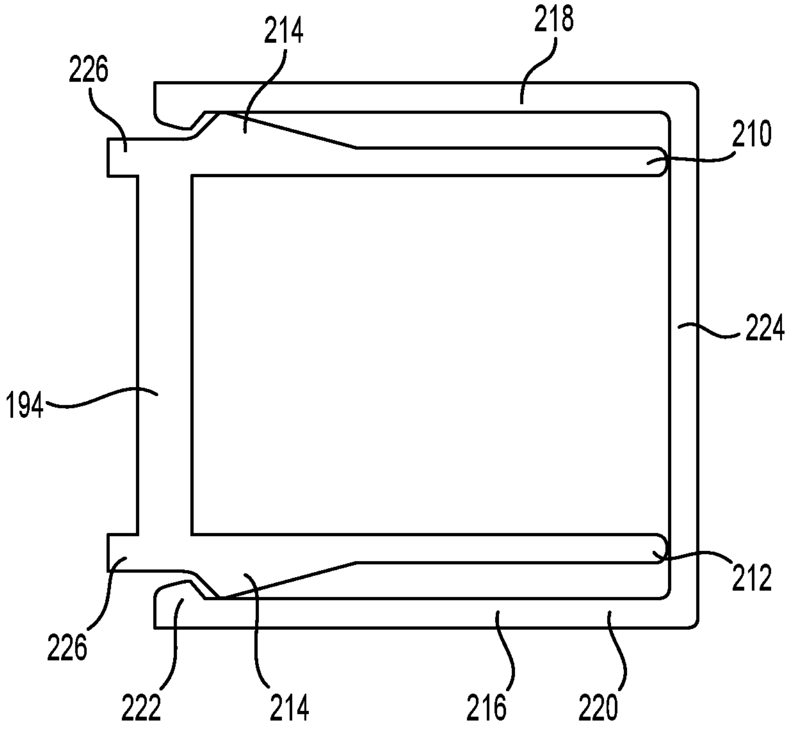
FIG. 23 is a top view of the wall jamb and a wall jamb cover according to an embodiment of the present disclosure.
Figure 24:
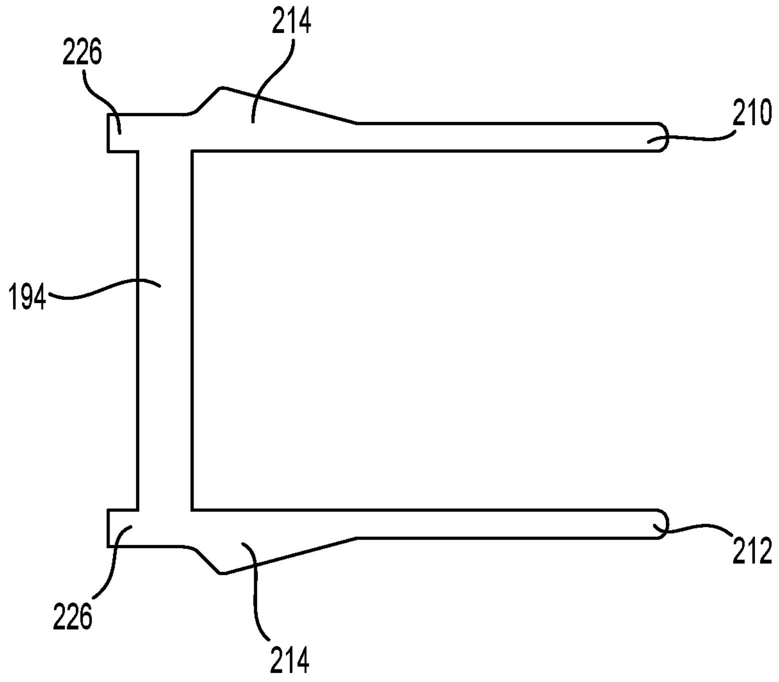
FIG. 24 is a top view of the wall jamb according to an embodiment of the present disclosure.

The narrowed wall jamb securing element 196 may include one or more apertures 198 configured to align with one or more apertures 200 of the wall jamb 194. The apertures 198 may be elongated so as to allow for height adjustments of the narrowed wall jamb securing element 196. The narrowed wall jamb securing element 196 may be dimensioned and configured to be cooperatively received in the wall jamb 194. The shower header retainer 186 may include a bumper 202 disposed at least partially around the retainer element 188, such as on opposing sides of the retainer element 188. The bumper 202 may be constructed of a material having a compressible resilience, such as rubber or another polymer. The shower header retainer 186 may also include one or more bumper engagement prongs 191, as illustrated in FIG. 19B, for engaging with the bumper 202. The bumper engagement prongs 191 are configured to be received (e.g., removably secured) in one or more cavities (not shown) on the bumper 202. The retainer element 188, the narrowed wall jamb securing element 196, and the one or more plugs may be integrally formed or separately formed and constructed of a rigid polymer, metal, or alloy.

The shower header retainer 186 may include one or more catcher openings 204 disposed on the interface side 190 and configured to securely receive (e.g., releasably friction fit) with one or more clips 208 of a door catcher 206.

Figure 25A:
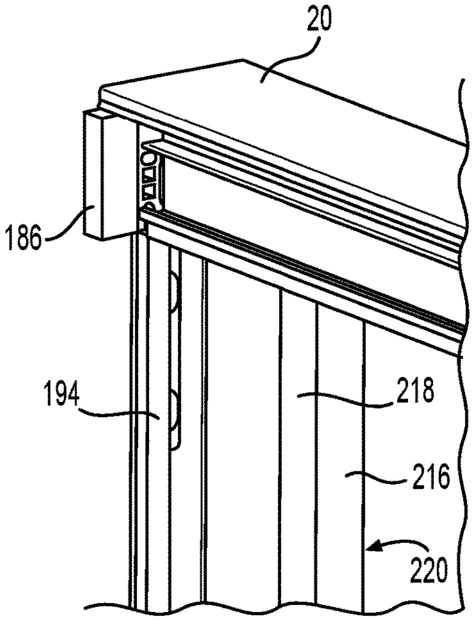
FIGS. 25A-25E are perspective views of the wall jamb and wall jamb cover according to various embodiments of the present disclosure.
Figure 25B:
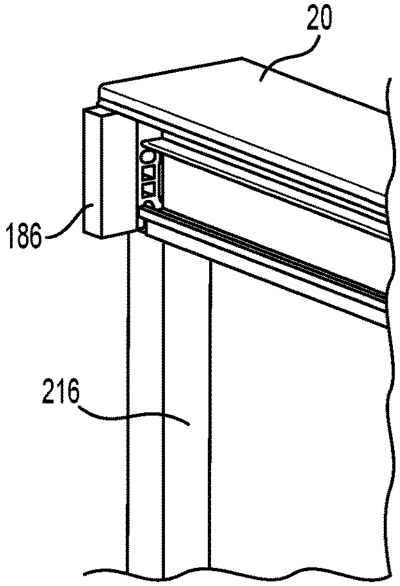
Figure 25E:
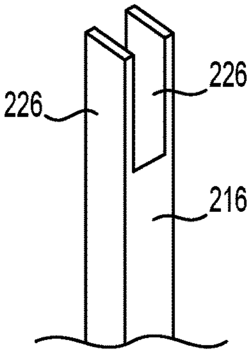
Figure 25C:
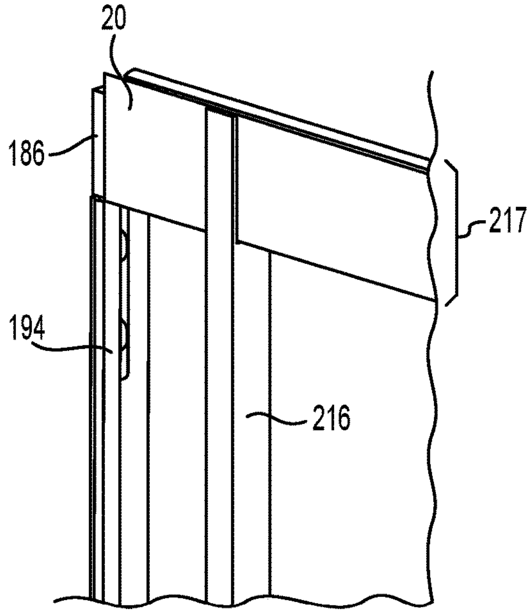
Figure 25D:
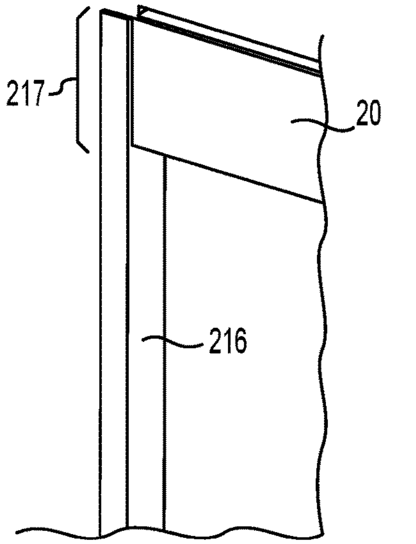
Figure 26:
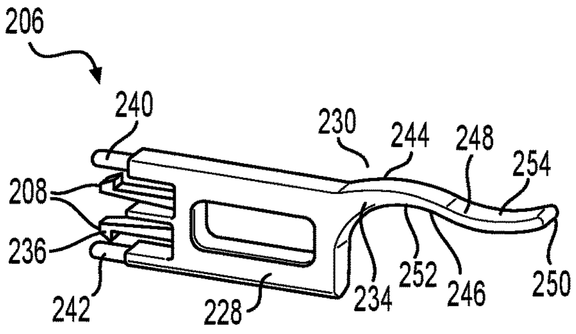
FIGS. 26 and 27 are front and back perspective views of a shower door catcher according to an embodiment of the present disclosure.
Figure 27:
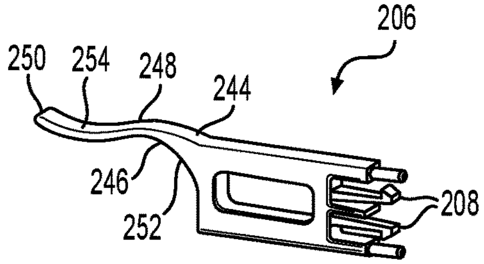
Figure 28:
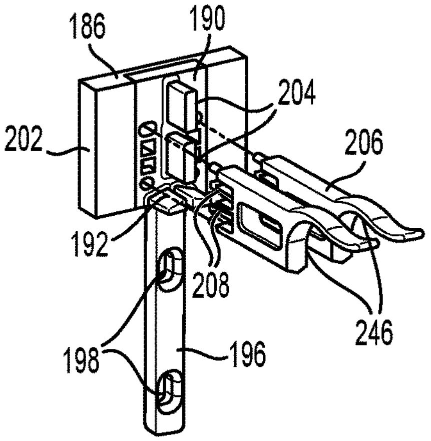
FIG. 28 is an exploded view of an assembly of the shower door catcher shown in FIGS. 26 and 27 and the shower header retainer according to one embodiment of the present disclosure.
Figure 29:
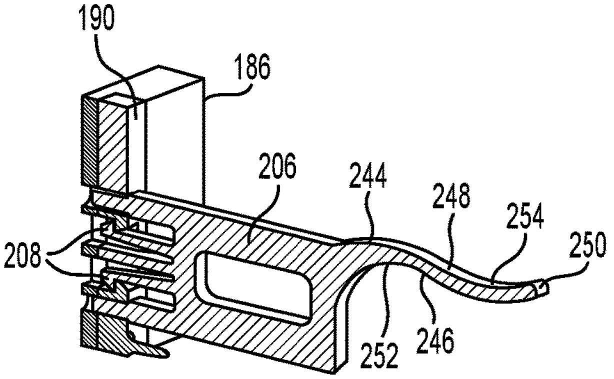
FIG. 29 is a cross-sectional view of the shower door catcher shown in FIGS. 26 and 27 engaged with the shower header retainer according to one embodiment of the present disclosure.
Figure 30:
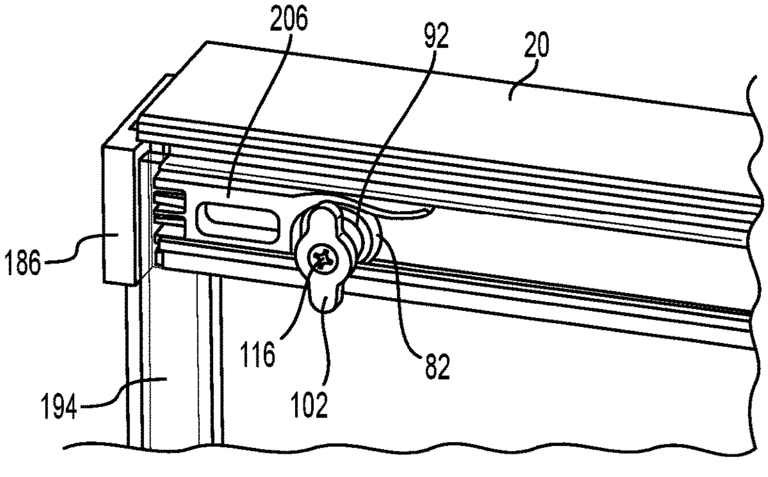
FIG. 30 is a front perspective view of the shower door catcher shown in FIGS. 26 and 27 assembled in an embodiment for a concealed or partially concealed shower door header.
Figure 31:
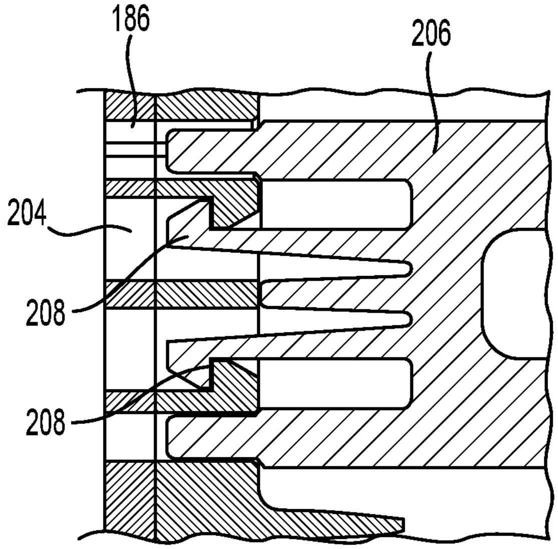
FIGS. 31 and 32 are cross-sectional views of the shower door catcher shown in FIGS. 26 and 27.
Figure 32:
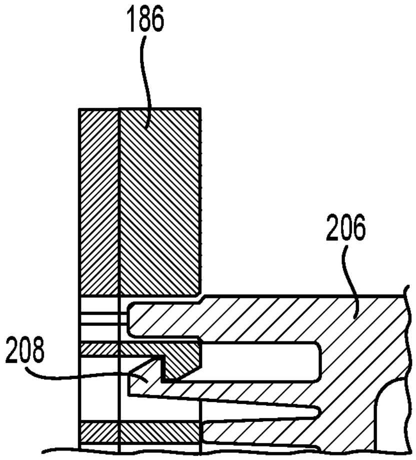
Figure 33:
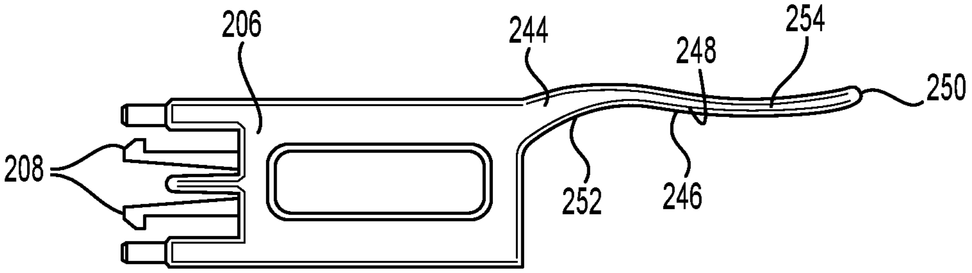
FIG. 33 is an elevation view of the shower door catcher shown in FIGS. 26 and 27.
Figure 34:
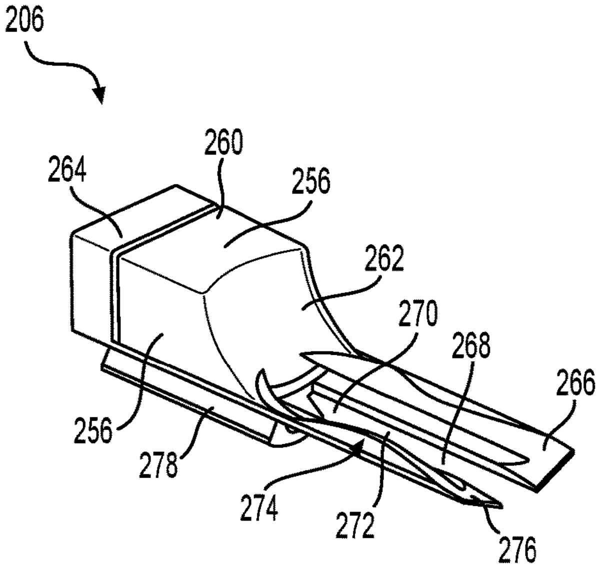
FIG. 34 is a front perspective view of the shower door catcher according to another embodiment of the present disclosure.
Figure 35:
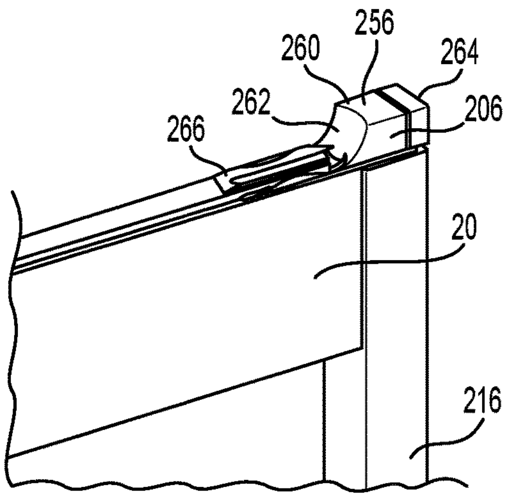
FIG. 35 is a perspective view of the shower door catcher shown in FIG. 34 engaged with the shower door header.
Figure 36:
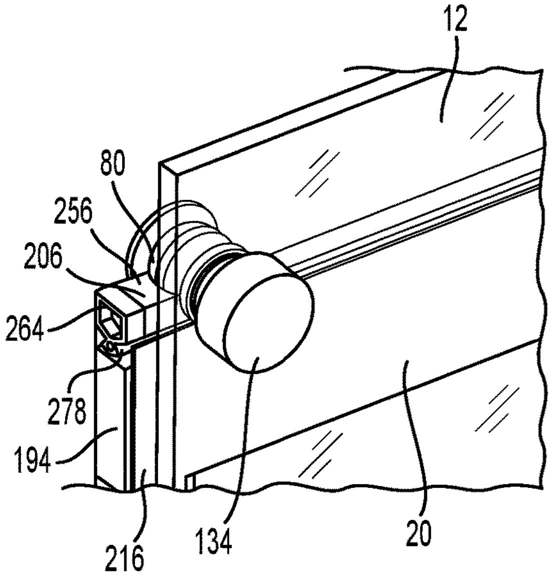
FIG. 36 is a front perspective view of the shower door catcher shown in FIG. 34 in an embodiment for a non-concealed or partially exposed shower door header.
Figure 37:
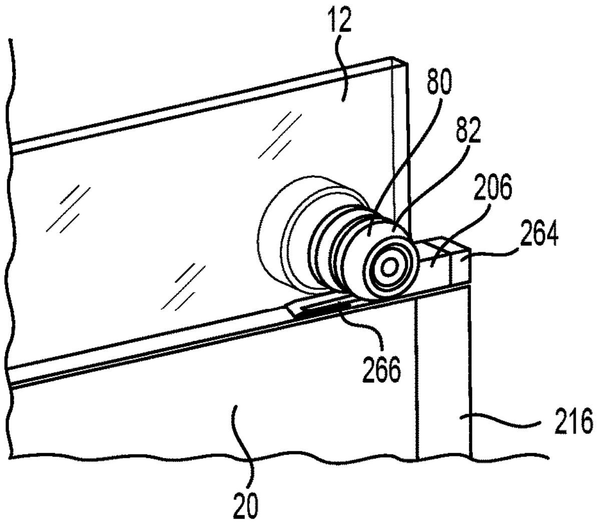
FIG. 37 is a rear perspective view of the shower door catcher shown in FIG. 34 in an embodiment for a non-concealed or partially exposed shower header door header.
Figure 38:
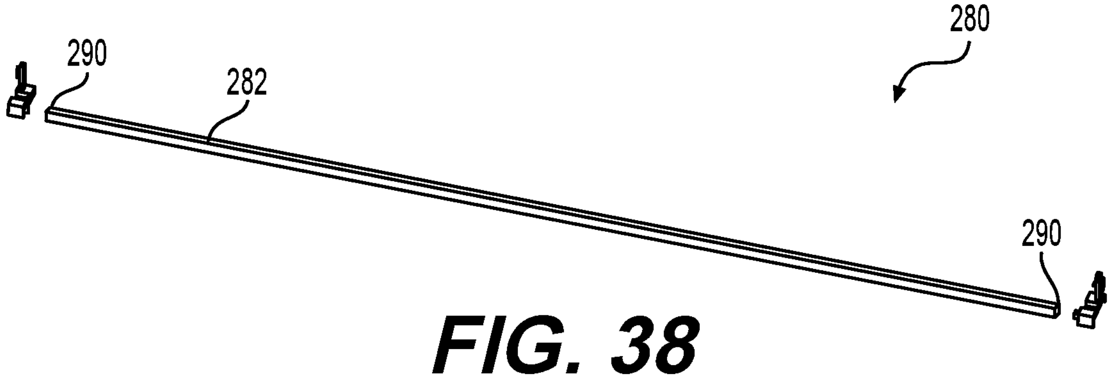
FIG. 38 is a front perspective view of a shower threshold according to an embodiment of the present disclosure.
Figure 39A:
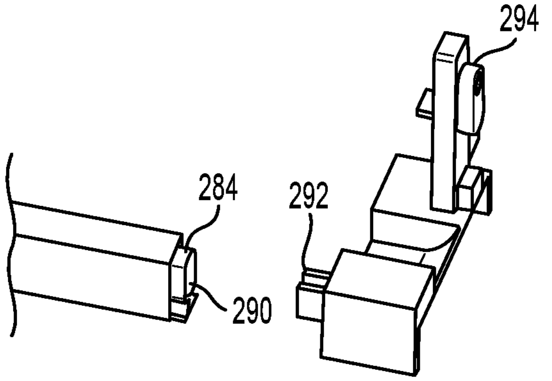
FIGS. 39A and 39B are views of an assembly of the shower threshold shown in FIG. 38 and a corner bracket disengaged (FIG. 39A) and engaged (FIG. 39B) therewith.
Figure 39B:
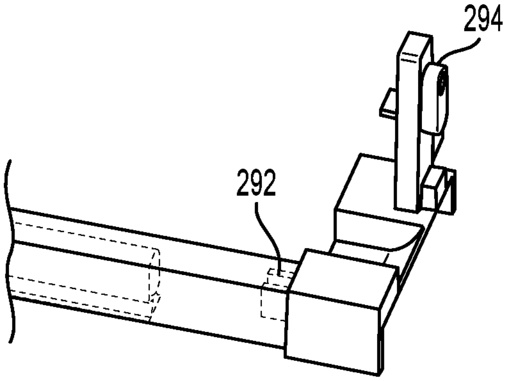

Referring to FIGS. 23, 24, and 25A-25E, the wall jamb 194 may include a first sidewall 210 and a second sidewall 212, each of the sidewalls 210, 212 extending downwardly along the wall jamb 194 such that the wall jamb 194 is vertically elongated. The first and second sidewalls 210, 212 may each comprise an outer sidewall lip 214 configured to engage a wall jamb cover 216. The wall jamb cover 216 may be configured to cover the first and second sidewalls 210, 212. The wall jamb cover 216 may include a first wall 218 and a second wall 220. Each of the first and second walls 218, 220 may include an inner cover lip 222 configured to cooperatively friction fit with the outer sidewall lips 214 of the first and second sidewalls 210, 212. The wall jamb cover 216 and the wall jamb 194 may have cooperative U-shaped profiles such that the U-shaped wall jamb 194 may be received in the U-shaped wall jamb cover 216. The wall jamb cover 216 may include a cover wall 224. The first and second walls 218, 220 may be configured such that they are spaced a distance that is greater than a width of the cover wall 224. As shown in FIGS. 25C-25E, the first and second walls 218, 220 may extend a distance defined by a height 217 of the header 20 beyond the cover wall 224 to form a pair of opposing extension walls 226 configured to receive the header 20.

Referring to FIGS. 26-37, the apparatus 10 may comprise the shower door catcher 206 for catching the shower door 12 such as to prevent, or limit, slamming of the shower doors 12 when opening or closing the doors 12. The shower door catcher 206 may be used in connection with either the concealed or non-concealed header 20 designs. FIGS. 26-33 show the shower door catcher 206 in an embodiment for a concealed or partially concealed header 20 design. FIGS. 34-37 show the shower door catcher 206 in an embodiment for a non-concealed or partially exposed header 20 design. The shower door catcher 206 may include an elongated catcher body 228 that has a flat and narrow profile in a widthwise direction and an elongated profile in a lengthwise direction.

The elongated body 228 may comprise a door catch arm side 230 and a clip side 232 opposite on the body 228 from the door catch arm side 230. A door catch arm 234 may be disposed on (e.g., extending from) the door catch arm side of the body 230. The one or more clips 208 may be configured to friction fit, or snap within, the interface element 190 (particularly the door catcher openings 193) of the shower header retainer 186. The one or more clips 208 may comprise opposing hooks 236. The door catcher openings 193 may comprise cooperative hooks 237 for engaging the opposing hooks 236. The one or more clips 208 may be resiliently biased such as to snap-fit. The shower door catcher 206 may comprise a first plug 238 disposed between the opposing hooks 236, a second plug 240 extending from the clip side 232, and a third plug 242 extending from the clip side 232. The plugs 238, 240, 242 may be received in the door catcher openings 193.

The door catcher 206 may comprise an upwardly extending portion 244 extending from the body 228. The upwardly extending portion 244 may define an indent 246 shaped to cooperatively receive the roller 82. The door catcher 206 may comprise a downwardly extending portion 248 that extends from the upwardly extending portion 244 oppositely from the body 228 on the upwardly extending portion 244. The shower door catcher 206 may comprise an upwardly extending tip 250 extending outwardly from the downwardly extending portion 248. The door catcher 206 may be deformable. In use, the roller 82 is guided under the upwardly extending tip 250 and past and against the downwardly extending portion 248, which slows the roller 82 (i.e., slowing the door 12) by converting translation force of the door 12 into deformation force to the catcher 206. After passing the downwardly extending portion 248, the roller 82 may come to rest, and be releasably secured, in the indent 246 defined by the upwardly extending portion 244. When a user desires to move the secured door 12, the user can exert sufficient translation force to move the roller 82 out of the indent 246 and past the downwardly extending portion 248 such that the user can freely slide the door 12. The upwardly extending portion may be defined by a concave curve 252, and the downwardly extending portion may be defined by a convex curve 254.

In other embodiments, the door catcher 206 may be configured for the shower door header 20 having an exposed design, as shown in FIGS. 34-37. The door catcher 206 may comprise a base 256 comprising a bottom portion 278, a bumper side 260, and an inwardly curving side 262 opposite on the base from the bumper side 250. The door catcher 206 may include a bumper 264 disposed on the bumper side 260 having the inwardly curving surface 262. The bumper 264 may be constructed of a resiliently compressible material, such as rubber or another polymer. The door catcher 206 may include one or more armatures 266 (e.g., opposing armatures) laterally extending from the bottom portion 278 and the bumper side 260 of the door catcher 206. The armatures 266 may be configured so as to cooperatively receive a roller, such as the roller 82.

The opposing armatures 266 may define an armature channel 268 for receiving the roller 82. The armature channel 268 may include a widened portion 270 positioned towards, or proximate to, the inwardly curving surface 262 of the bumper 264. The channel 268 may include a narrowed portion 272 positioned proximate to the narrowed portion opposite on the channel 268 from the inwardly curving surface 262. The armatures 266 may each include a raised portion 274 that rises, or extends upwardly, as the raised portion 274 extends along a free end 276 of the armatures 266 toward the inwardly curving surface. The channel 268 and/or the raised portion 274 may cooperatively receive and create slow down a moving roller 20 as the roller moves over the channel 268 and the raised portion 274, ultimately resting securely at the widened portion 270 and/or the raised portion 274. A user can move the shower door 12 from this secure position by exerting sufficient force on the door so as to move the roller out of the widened portion 270 and/or the raised portion 274 and past the narrowed portion 272 and the free end 276 and out of the catcher 206.

The door catcher 206 may comprise a guide 278 downwardly extending from bottom portion 278. The guide may laterally extend along the base 256 and the bumper 264. The guide may have a profile that is complementary to the profile of the header aperture 78 formed by the wedge-shaped fingers 76, such as an isosceles triangular profile.

Figure 40:
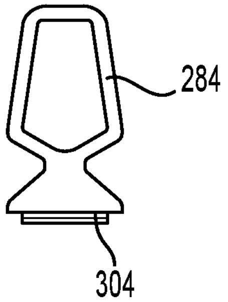
FIG. 40 shows a side view of an inner portion of the shower threshold according to an embodiment of the present disclosure.
Figure 41:
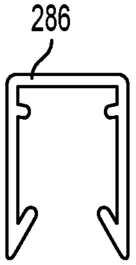
FIG. 41 shows a side view of an outer portion of the shower threshold according to an embodiment of the present disclosure.
Figure 42:
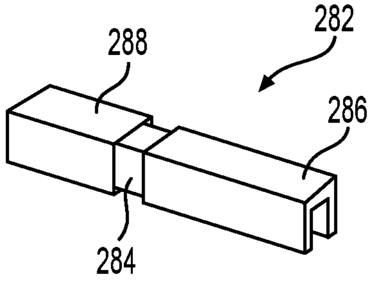
FIG. 42 shows the inner and outer portions of the shower threshold slidably engaged according to an embodiment of the present disclosure.
Figure 43:
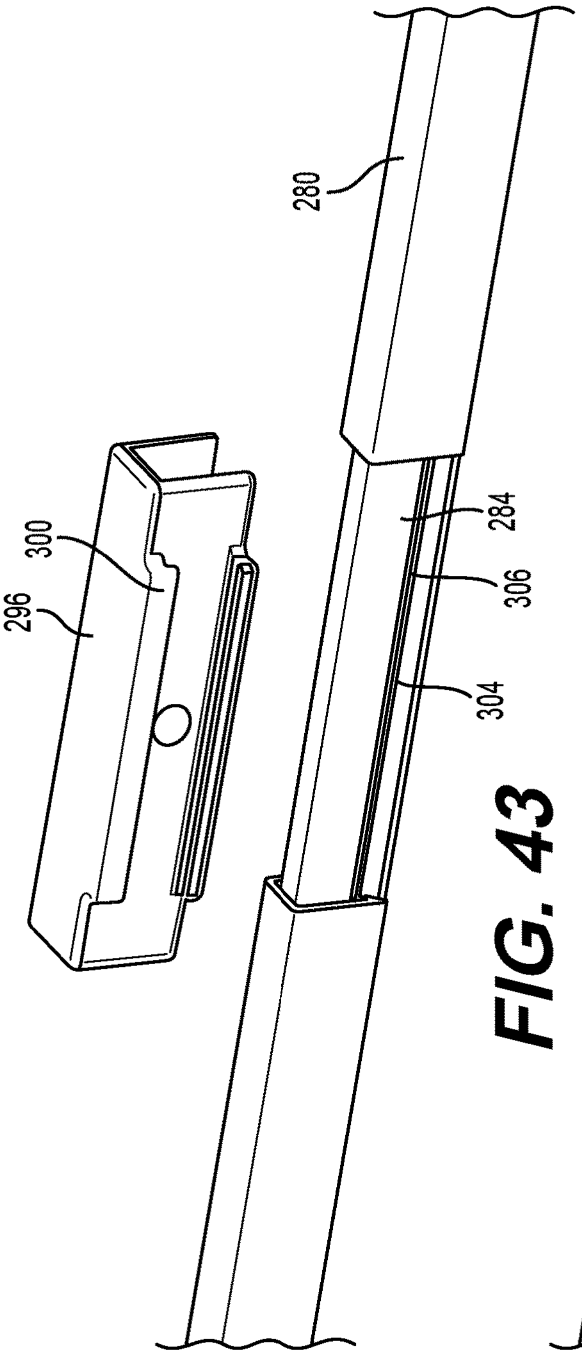
FIG. 43 is a front perspective view of a cap for engagement with the shower threshold when in an extended position.
Figure 44:
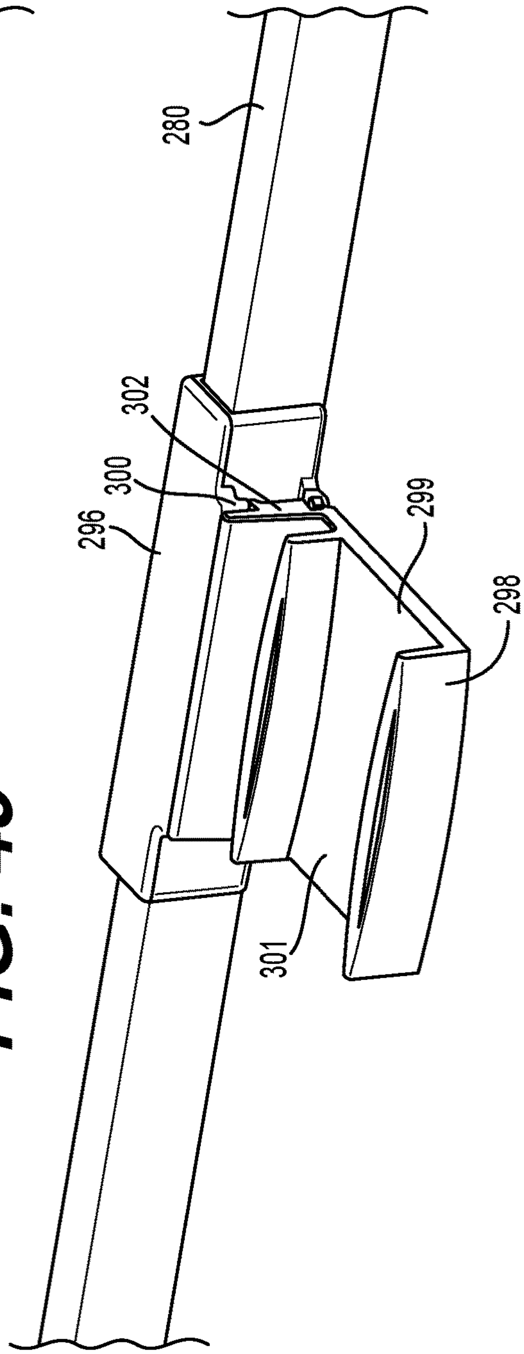
FIG. 44 is a front perspective view of the cap and a glass door receiver engaged with the shower threshold according to an embodiment of the present disclosure.
Figure 45:
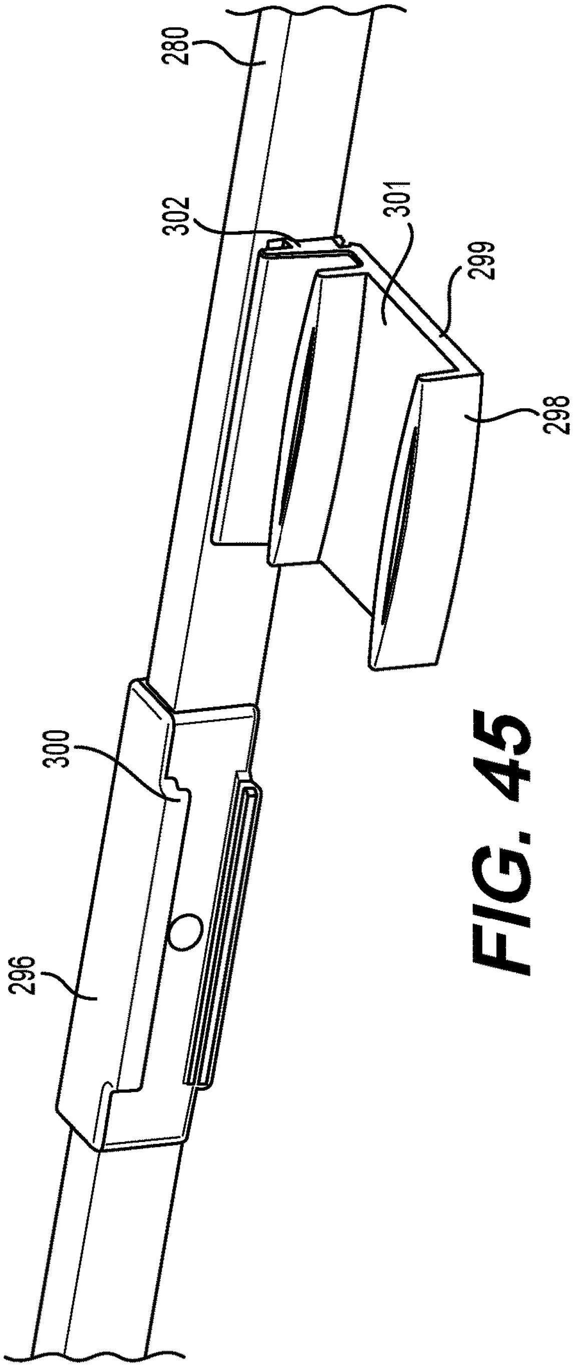
FIG. 45 is a front perspective view of the cap and the glass door receiver engaged with the shower threshold according to another embodiment of the present disclosure.
Figure 47:
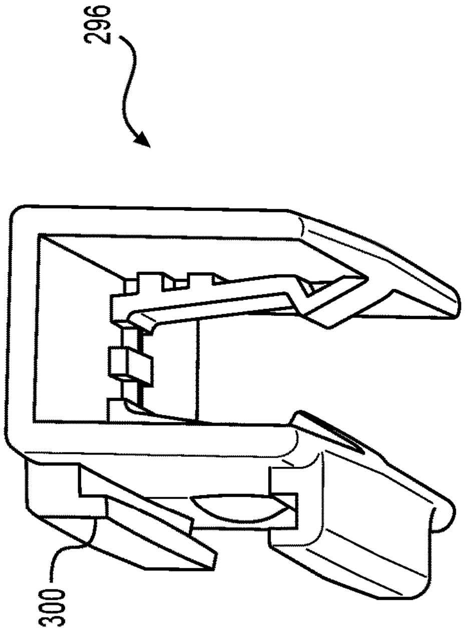
FIG. 47 is a side view of the cap shown in FIG. 43.
Figure 46:
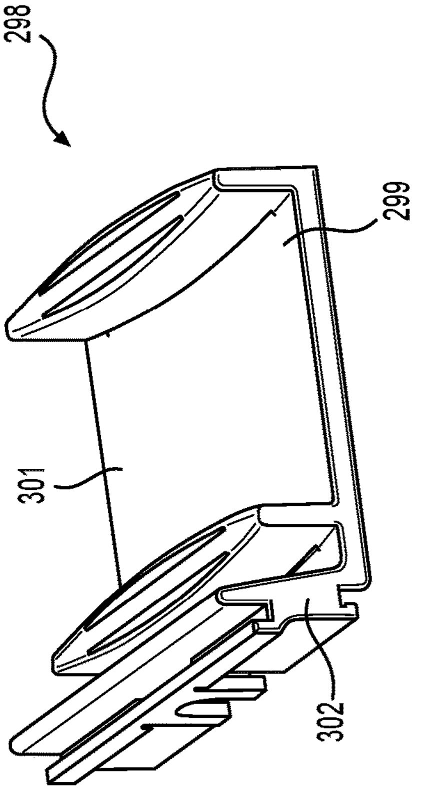
FIG. 46 is a side perspective view of the glass door receiver according to an embodiment of the present disclosure.
Figure 48:
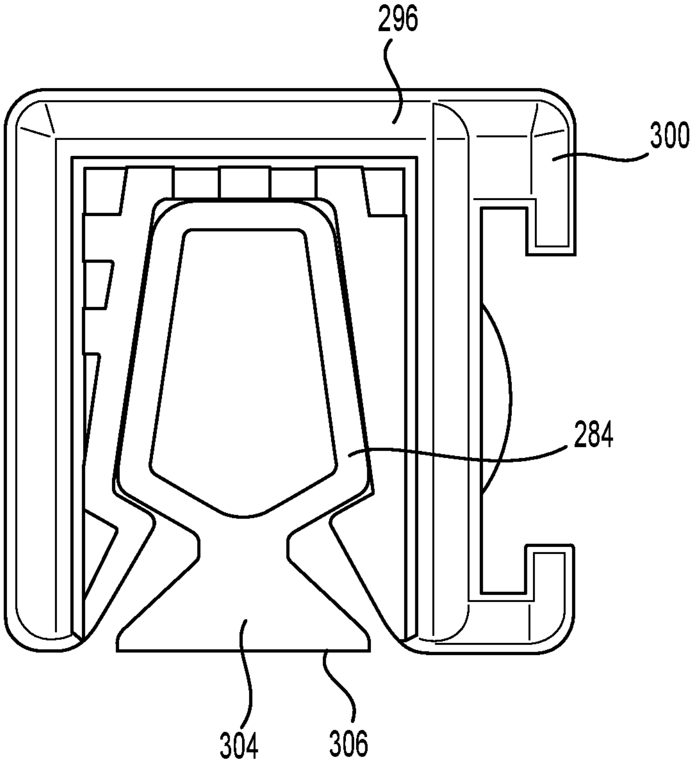
FIG. 48 is a side view of the cap engaged with the inner portion of the shower threshold according to an embodiment of the present disclosure.

Referring to FIGS. 38-51, the apparatus 10 may include a shower threshold 280. The shower threshold 280 may comprise an extendable elongated body 282. Advantageously, extendable threshold 280 avoids the need for cutting, thus making for convenient installation. The extendable elongated body 282 may include an inner threshold 284, a first outer threshold 286, and a second outer threshold 288. The outer thresholds 286, 288 may each be disposed over the inner threshold 284 and slidable longitudinally along the inner threshold along the elongated body 282. As shown in FIGS. 40 and 41, the inner threshold 284 and the outer thresholds 286, 288 may have different yet cooperative profiles.

The extendable elongated body 282 may include a pair of ends 290, each end 290 configured to be securely received in a threshold interface element 292 of a corner bracket 294. The threshold 280 may be extendable by telescoping of the ends 290 (e.g., on the outer thresholds 286, 288) relative to one another.

Figure 49:
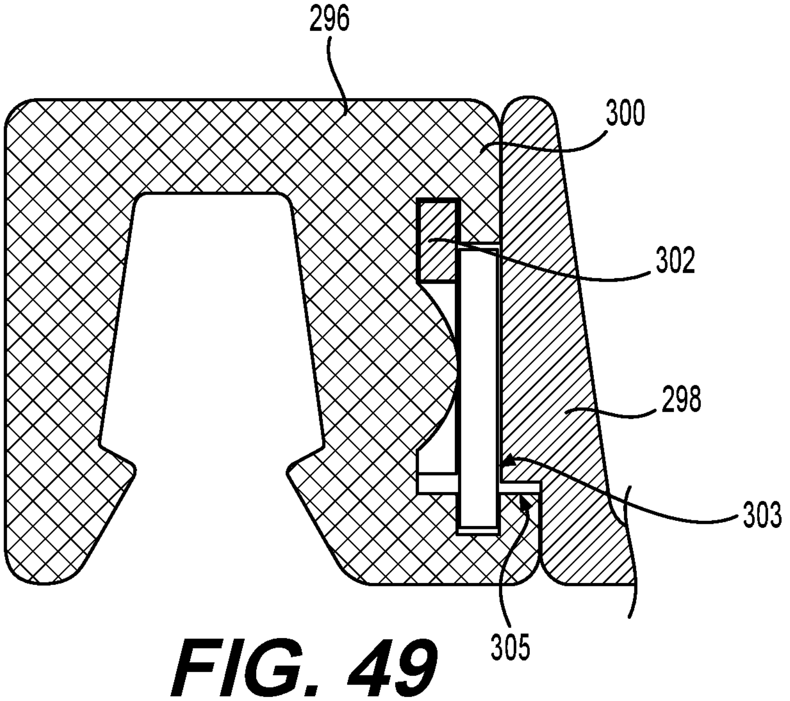
FIGS. 49-50 are cross-sectional views of the cap engaged with a receiver for a glass door according to various embodiments of the present disclosure.
Figure 50:
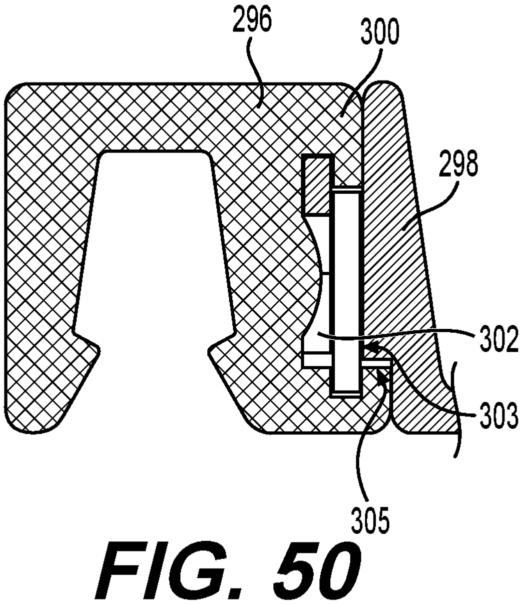
Figure 51:
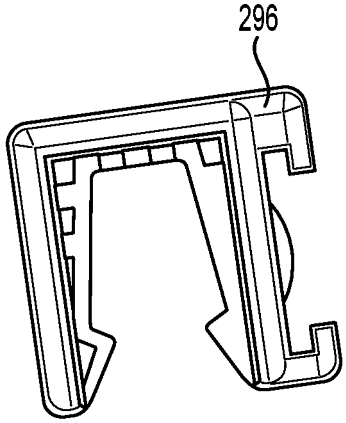
FIG. 51 is a side view of the cap according to an embodiment of the present disclosure.
Figure 52:
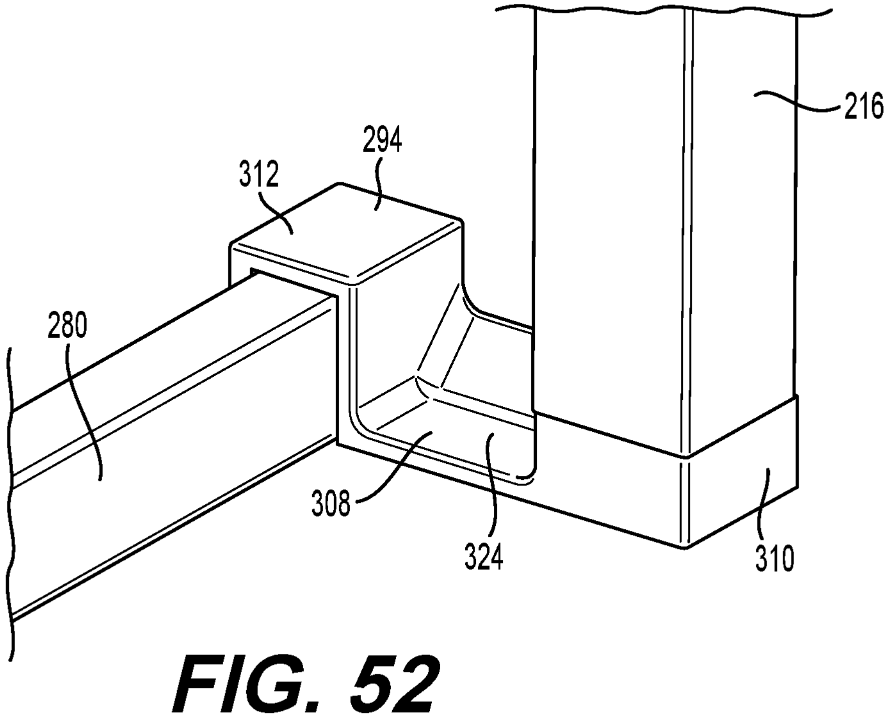
FIG. 52 is a front perspective view of the corner bracket with the shower threshold engaged therewith according to an embodiment of the present disclosure.
Figure 53:
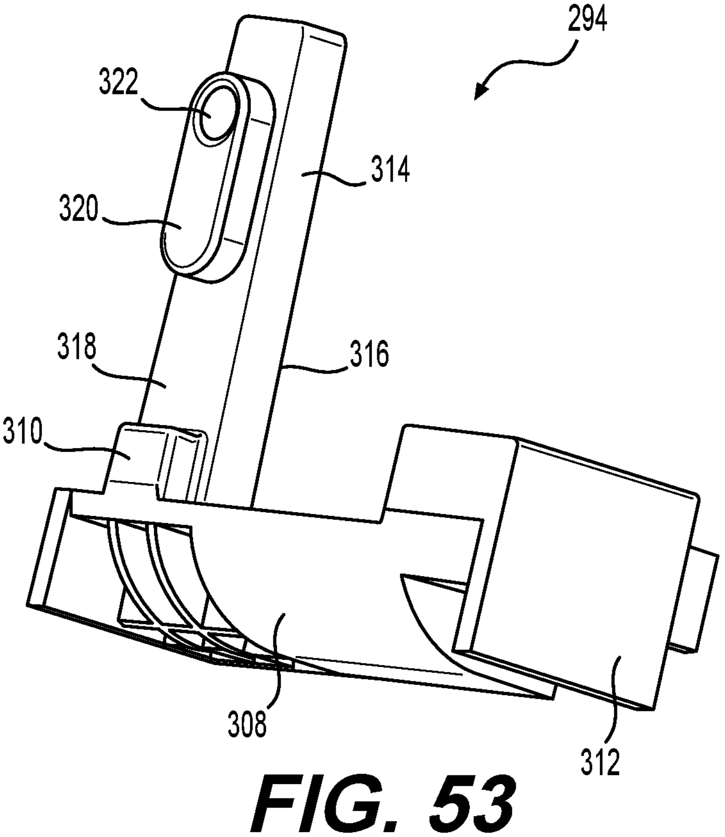
FIG. 53 is a rear perspective view of the corner bracket according to an embodiment of the present disclosure.
Figure 54:
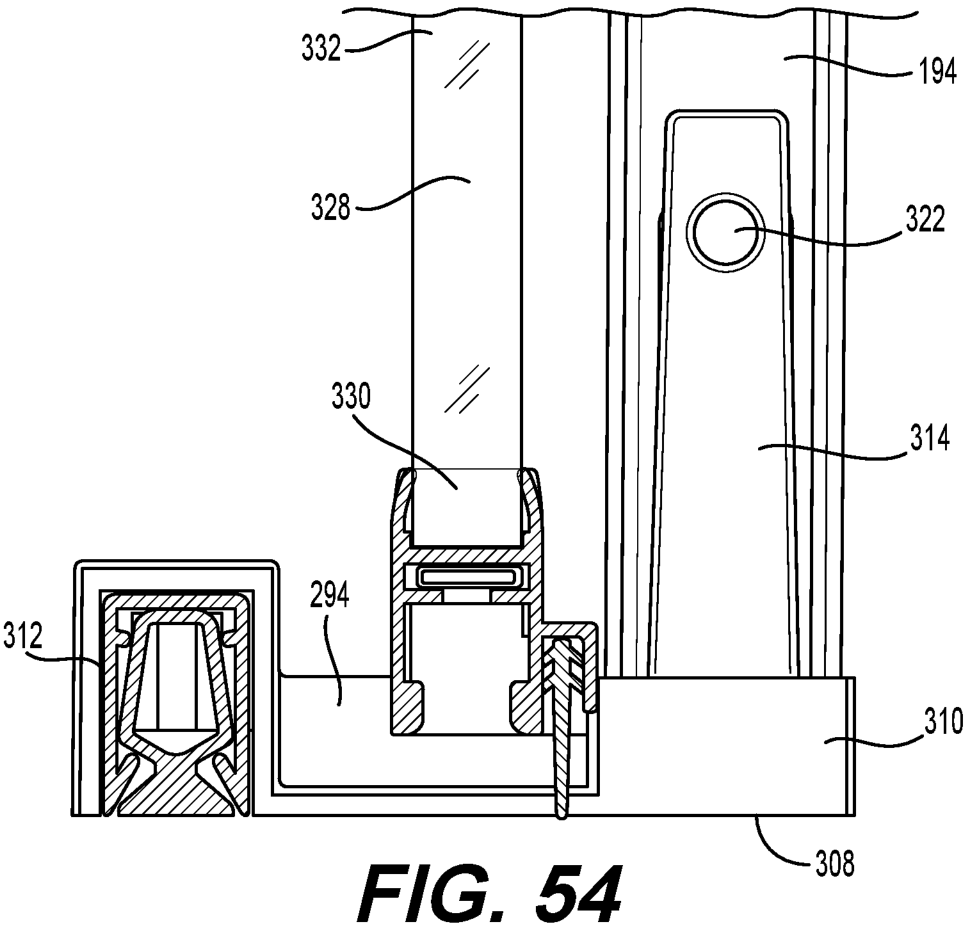
FIG. 54 is a cutaway view of the corner bracket with the shower threshold, the wall jamb, and a glass panel engaged therewith, according to an embodiment of the present disclosure.
Figure 55:
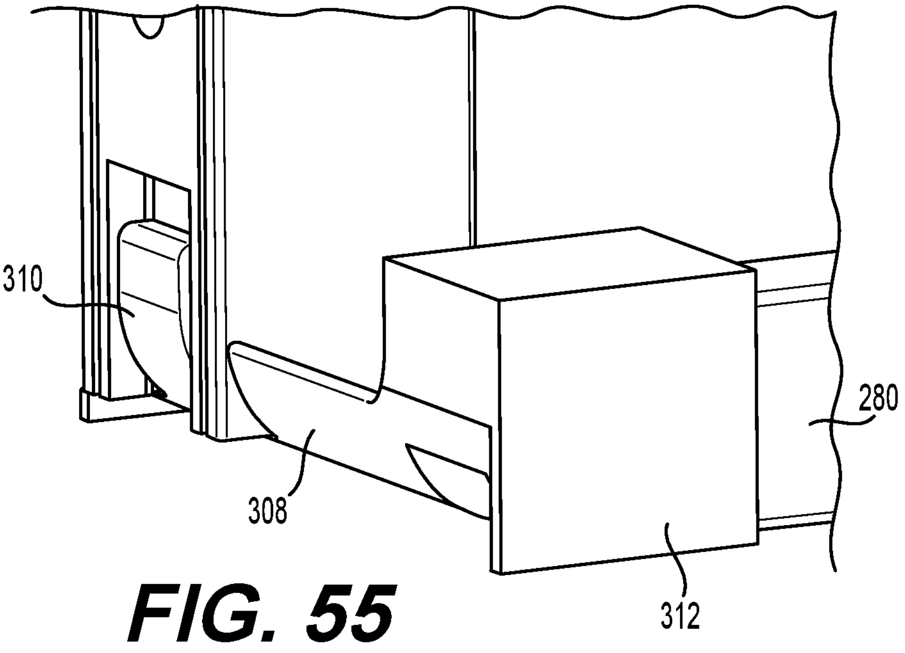
FIG. 55 is a rear perspective view of the corner bracket with the shower threshold engaged therewith according to another embodiment of the present disclosure.
Figure 56:
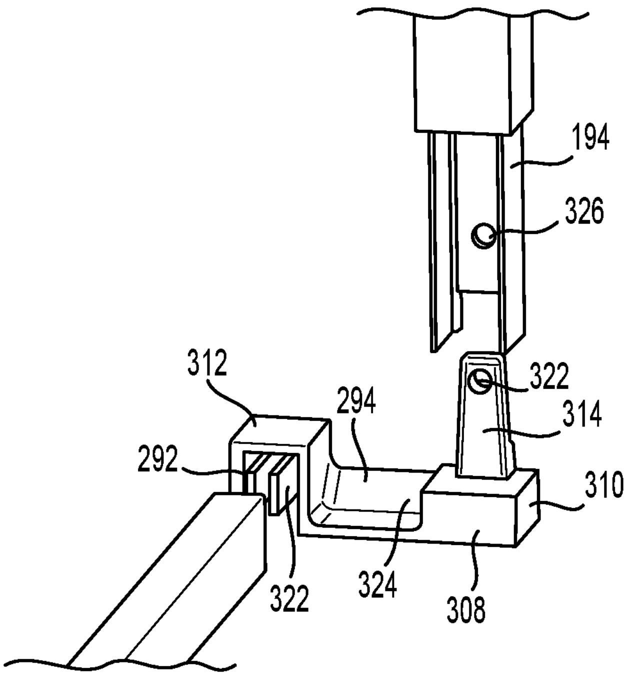
FIG. 56 is an exploded view of an assembly of the corner bracket, the wall jamb, and the shower threshold according to an embodiment of the present disclosure.

As shown in FIGS. 43-51, the apparatus 10 may include a cap 296 configured to be releasably received on (e.g., friction fit with) the inner threshold 284 when the threshold 280 is in an extended position, thereby exposing the inner threshold 284. The apparatus 10 may include a receiver 298 configured to receive the glass door 12 via a glass door receiver element 299, such as a door channel 301, the receiver 298 slideably engageable with the cap 296 via a slide element 300 on the cap 296. The slide element 300 may be configured to releasably and slideably engage a cooperative slide element 302 on the receiver 298. As shown in FIGS. 49 and 50, the receiver 298 may include a rear wall 303 having a cutout complementary in shape to a seating surface 305 on the slide element 300. The seating surface 305 may be adapted for cooperating with the rear wall 303 of the slide element 300. The inner threshold 284 may comprise a bottom surface 304 having a fastener 306, such as an adhesive or double-sided tape, for securing the bottom surface 304 to a floor and creating a watertight or water-resistant seal to prevent water from passing under the threshold 280 from the shower area 16 to the surrounding area 18.

As shown in FIGS. 52-56, the apparatus 10 may include the corner bracket 294. The corner bracket 294 may include an elongated base 308. The elongated base may include a wall jamb side 310 and a threshold side 312 disposed oppositely on the base 308 from the wall jamb side 310. A tapered stem 314 may extend upwardly from the wall jamb side 310 for engaging and receiving the bottom of a wall jamb, such as the wall jamb 194. Advantageously, the tapered profile of the stem 314 enables the wall jamb 194 to be easily adjusted laterally and longitudinally such that the installer can make adjustments when installing the wall jamb 194. The stem 314 may include a door side 316, a wall side 318, and a stem protrusion 320 extending from the stem on the wall side 318. A stem aperture 322 may extend longitudinally through the door side 316, the wall side 318, and the stem protrusion 320. Thus, a fastener, such as a screw, may be received in the stem aperture 322 to secure the corner bracket to a wall of a structure, such as a wall proximate to the shower area 16. In some embodiments, the stem aperture 322 may be configured to align with a wall jamb hole 326 of the wall jamb 194 when the wall jamb 194 is disposed over the tapered stem.

The corner bracket 294 may include the threshold interface element 292 disposed at the threshold side 312 of the base 308, the threshold interface element 292 configured to be slidably receive a shower door threshold, such as the shower door threshold 280. The threshold interface element 292 may include one or more threshold plugs 322 configured to receive the shower door threshold 280 to help the user align the shower door threshold 280 with the corner bracket 294 before the fastener 306 is fastened.

The corner bracket 294 may comprise a downwardly sloping top surface 324 disposed between the wall jamb side 310 and the threshold side 312 such as to direct water away and downwards from the base 308 to facilitate water drainage.

The apparatus 10 may include a glass panel 328, such as a glass panel for the shower door 12. In some embodiments, the glass panel 328 may be substantially planar. In other embodiments, the glass panel 328 may be substantially non-planar or include substantially non-planar portions. The glass panel 328 may include a bottom portion 330 and a top portion 332. The glass panel 328 may comprise pre-drilled holes for components (such as a handle or the roller assembly 80) or no pre-drilled holes.

Figure 57:
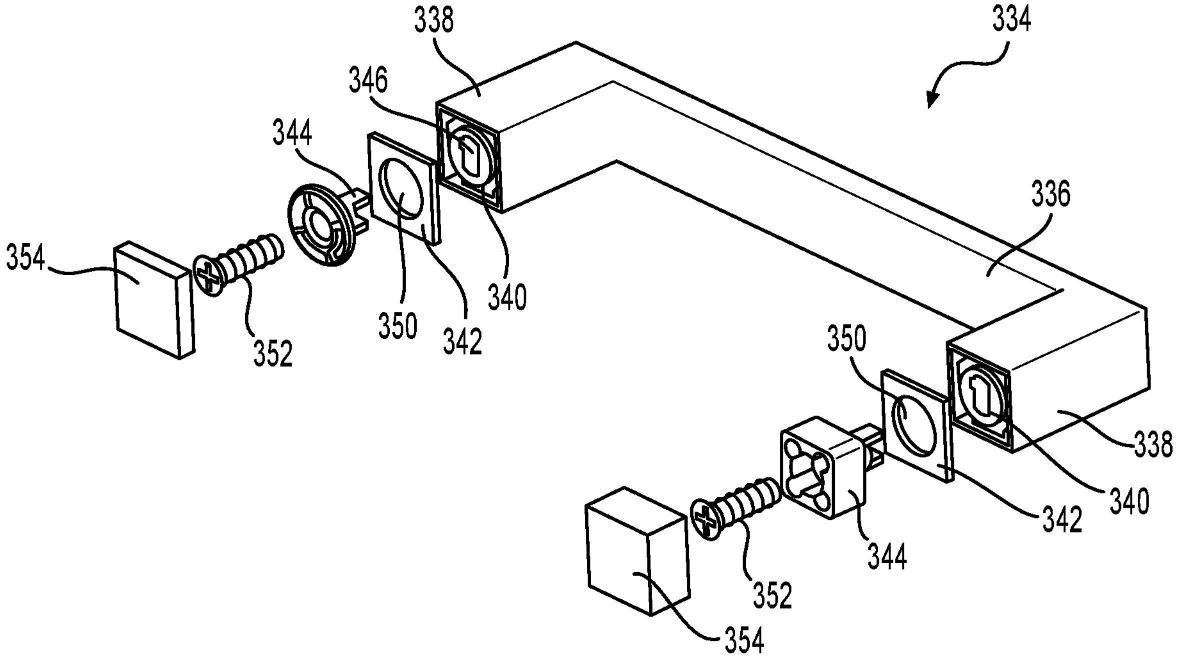
FIG. 57 is an exploded view of a handle assembly according to an embodiment of the present disclosure.

As shown in FIG. 57, the apparatus 10 may include a handle assembly 334 for installation on the glass panel 328 for opening and closing the shower door 12. The handle assembly 334 may comprise a handle 336. The handle 336 may have a rectangular, circular, oval, or any other suitable profile. The handle may comprise a pair of handle ends 338, the handle ends 338 comprising a handle securing element 340. The handle assembly 334 may include one or more washers 342 that are configured to be disposed at the handle ends 338. The handle assembly 334 may include one or more plugs 344 configured to be securely received, and mate with, the handle securing element 340. The washers 342 may be securely disposed between secured plugs 344 and the handle ends 338. The handle ends 338 may comprise a handle aperture 346, the washer 342 a washer aperture 348, and the plug 344 a plug aperture 350. The apertures 346, 348, 350 may be configured to align when the handle assembly 334 is assembled. Apertures (not shown) of the glass panel 328 may be disposed between the washers 342 and the plugs 344. A fastener 352, such as a screw or bolt, may be configured to be received in the apertures 346, 348, 350 so as to releasably secure the handle 336, the washers 342, and the plugs 344. The handle assembly 334 may comprise one or more fastener covers 354 configured to be securely received by (e.g., friction fit with) the one or more plugs 344 and cover the fasteners 352. The washers 342 and the fastener covers 354 may have a profile that matches the profile of the handle.

Figure 58:
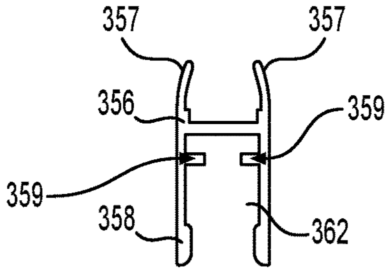
FIGS. 58 and 59 show side views of a bottom frame for attachment to a glass panel according to embodiments of the present disclosure.
Figure 59:
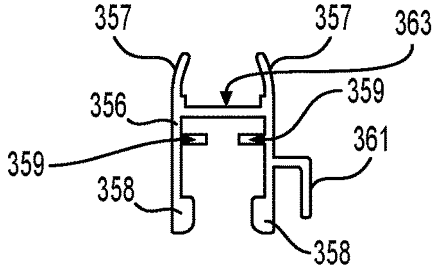
Figure 60:
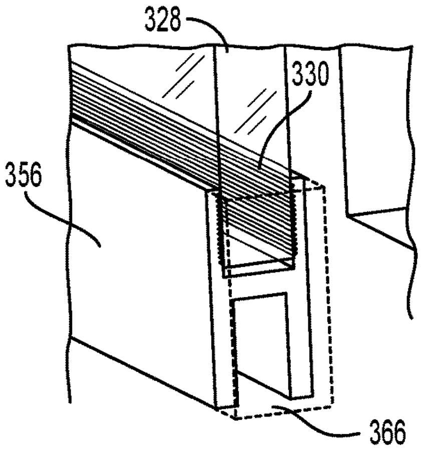
FIGS. 60 and 61 show front perspective views of the bottom frame for engagement with the glass panel according to various embodiments of the present disclosure.
Figure 61:
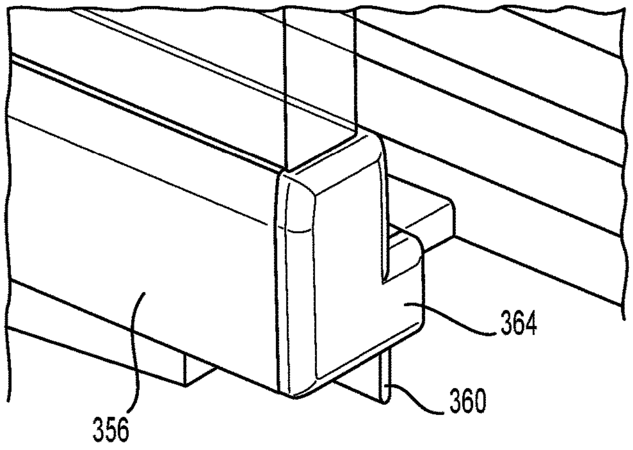
Figure 62:
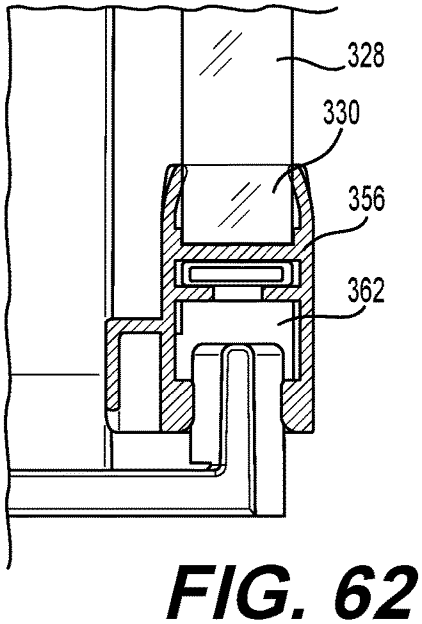
FIGS. 62 and 63 show partial cutaway views of the glass panel attached to the corner bracket according to an embodiment of the present disclosure.
Figure 63:
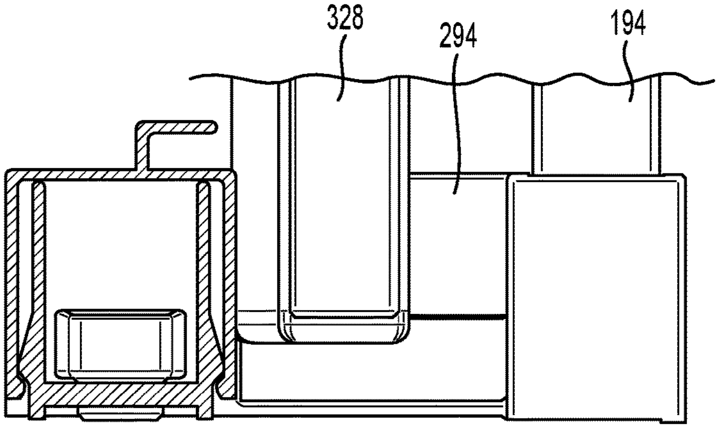
Figure 64B:
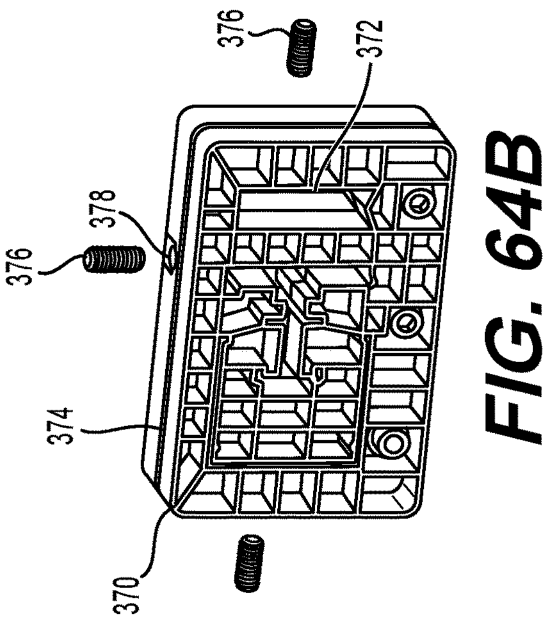
FIG. 64B is a rear perspective view of the cutting guide shown in FIG. 64A.
Figure 64D:
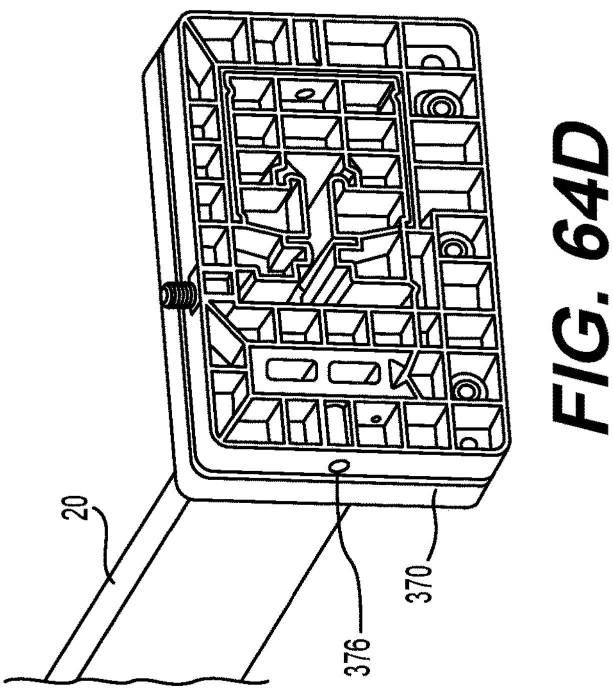
FIG. 64D is a perspective view of the cutting guide engaged with the shower door header according to an embodiment of the present disclosure.
Figure 64A:
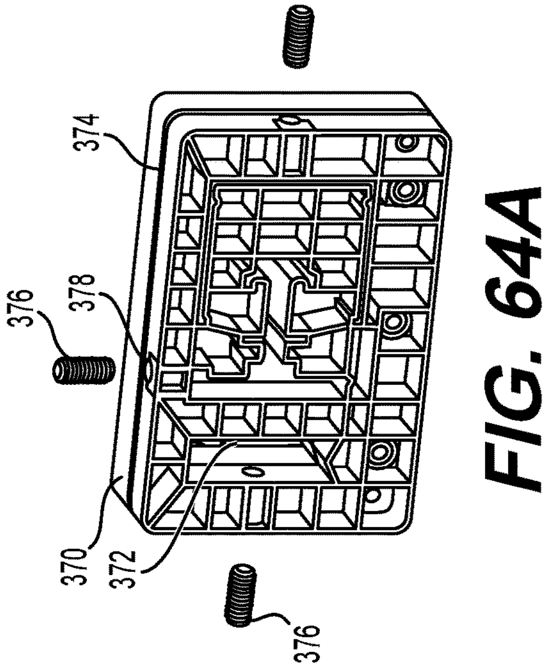
FIG. 64A is a front perspective view of a cutting guide according an embodiment of the present disclosure.
Figure 64C:
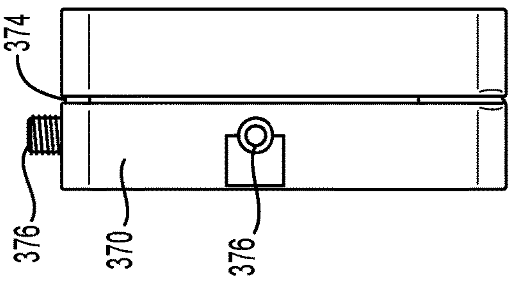
FIG. 64C is a side view of the cutting guide shown in FIG. 64A.

As shown in FIGS. 58-63, the apparatus 10 may include a bottom frame 356 configured to be secured with the bottom portion of the glass panel 328. As illustrated in FIG. 58, the bottom frame 356 includes two legs 357 spaced a distance apart by a center member 363. Each of the legs 357 includes an inwardly protruding member 359 positioned below the center member 363. The legs 357 and the inwardly protruding members 359 are configured to support the glass panel 328. The bottom frame 356 may include one or more sweeps 358. As illustrated in FIG. 59, the leg 357 may further include an outwardly protruding member 361.

The bottom frame may comprise a drip edge 360. The bottom frame 356 may include a bottom frame open end 362, which may be configured to securely receive (e.g., friction fit) a bottom frame cap 364 for covering the open end 362. In some embodiments, frame bumper 366 may be configured to be received, via, for example, a friction fit, on the open end 362 on the frame.

As shown in FIGS. 64A-64D, the apparatus 10 may include a cutter guide 370 for cutting the header 20. The cutting guide 370 may include a header slot 372 configured to receive the header 20. The cutter guide 370 may include a cutting passage 374 for receiving a cutter (not shown), such as a saw blade, disposed in an orthogonal orientation relative to the header slot 372 such that when the header 20 is received within the header slot 372, the cutter may cut off (i.e., saw off) a length of the header 20 to achieve a desired length of the header 20. The cutter guide 370 (or any of the components herein) may be constructed of one or more suitable materials, such as a polymer, a metal, or an alloy. The cutter guide 370 may comprise one or more cutter fasteners 376 (such as threaded pins, screws, or bolts) configured to be received in cutter apertures 378 for securing the header 20 in a cutting position.

Although embodiments of the disclosure have been described using specific terms, devices, and methods, such description is for illustrative purposes only. The words are words of description rather than of limitation. It is to be understood that changes and variations may be made by those of ordinary skill in the art without departing from the spirit or scope of the present disclosure, which is set forth in the following claims. It is further noted that any range provided herein provides support and a basis for any subset within that range. Further embodiments of the disclosure contain combinations, or exclusions, of different embodiments described herein.

Thus, although there have been described embodiments of the present invention of a new and useful apparatus, it is not intended that such references be construed as limitations upon the scope of this invention except as set forth in the following claims.

What is claimed is:

1. A shower door header, comprising, an elongated body extending lengthwise, the body including
  a sidewall including
    a first side facing a first direction,
    a second side facing a second direction opposite of the first direction,
    a top portion, and
    a bottom portion;
  a first arm orthogonally extending from the first side and top portion of the sidewall; and
  a second arm orthogonally extending from the second side and top portion of the sidewall;
  a guide disposed on the bottom portion of the sidewall; and
  an anti-jump element integrally disposed on the sidewall between the arms and the guide, the anti-jump element extending from the sidewall by at least a majority of the guide.

2. The shower door header of claim 1, wherein the anti-jump element includes:

a first protrusion extending orthogonally from the sidewall in the first direction; and a second protrusion extending orthogonally from the sidewall in the second direction.

3. The shower door header of claim 1, wherein the guide comprises a first channel disposed lengthwise along the first side of the sidewall, and wherein the guide comprises a second channel disposed lengthwise along the second side of the sidewall.

4. The shower door header of claim 3, wherein the first channel and the second channel each comprise:

a first downwardly extending leg and a second downwardly extending leg, the first leg extending from the sidewall and the second leg extending from the first leg; and a stanchion extending upwardly from the second leg and disposed on the second leg opposite of the first leg.

5. The shower door header of claim 4, wherein the first leg, the second leg, and the stanchion define a groove configured to receive a shower door roller movable lengthwise along the elongated body.

6. The shower door header of claim 1, further comprising an elongated cover configured to be disposed over and securely engage the elongated body.

7. The shower door header of claim 1, further comprising one or more ribs extending downwardly from each of the first arm and the second arm.

8. The shower door header of claim 7, wherein the one or more ribs comprises an outer rib, the outer rib comprising an outwardly extending protuberance.

9. The shower door header of claim 8, further comprising a cover configured to be disposed over the elongated body, the cover comprising opposing extensions configured to friction fit with the outwardly extending protuberance.

10. The shower door header of claim 9, wherein the cover comprises a base and opposing side supports extending from the base, wherein the opposing extensions are disposed on each of opposing side supports, respectively.

11. The shower door header of claim 10, wherein the opposing side supports each comprise an inwardly extending lip opposite from the base.

12. The shower door header of claim 1, wherein the body comprises one or more open cavities.

* * * * *